(12) United States Patent
Cao et al.

(10) Patent No.: US 12,143,865 B2
(45) Date of Patent: Nov. 12, 2024

(54) SYSTEM AND METHOD FOR MANAGING MULTIMEDIA BROADCAST MULTICAST SERVICE (MBMS) CONTINUITY

(71) Applicant: ZTE CORPORATION, Guangdong (CN)

(72) Inventors: Kun Cao, Shenzhen (CN); Tao Qi, Shenzhen (CN); Feng Xie, Shenzhen (CN); Hao Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 341 days.

(21) Appl. No.: 17/854,551

(22) Filed: Jun. 30, 2022

(65) Prior Publication Data

US 2022/0345947 A1 Oct. 27, 2022

Related U.S. Application Data

(63) Continuation of application No. PCT/CN2020/070242, filed on Jan. 3, 2020.

(51) Int. Cl.
*H04W 36/00* (2009.01)
*H04W 4/06* (2009.01)

(52) U.S. Cl.
CPC ......... *H04W 36/0007* (2018.08); *H04W 4/06* (2013.01)

(58) Field of Classification Search
CPC ............................ H04W 36/0007; H04W 4/06
USPC ......................................................... 370/312
See application file for complete search history.

(56) References Cited

U.S. PATENT DOCUMENTS

| 12,069,591 B2 | 8/2024 | Cui et al. |
| 2011/0116433 A1 | 5/2011 | Dorenbosch |
| 2016/0014571 A1 | 1/2016 | Lee et al. |
| 2018/0035265 A1 | 2/2018 | Kim et al. |

(Continued)

FOREIGN PATENT DOCUMENTS

| CN | 101350663 A | 1/2009 |
| CN | 101562602 A | 10/2009 |

(Continued)

OTHER PUBLICATIONS

Alcatel Shanghai Bell, "Discussion on E-MBMS", TSG-RAN WG3, R3-061011, Sep. 1, 2006, Tallinn, Estonia (5 pages).

(Continued)

*Primary Examiner* — Mark G. Pannell
(74) *Attorney, Agent, or Firm* — Foley & Lardner LLP

(57) ABSTRACT

A system and method for managing Multimedia Broadcast Multicast Service (MBMS) continuity. The system and method include transmitting, by a wireless communication device through a first distributed unit (DU) of a wireless communication node to a central unit (CU) of the wireless communication node, a first message. The first DU corresponds to a first subset of a plurality of MBMS services of the CU. The first message indicates a second subset of the plurality of MBMS services that corresponds to a second DU of the wireless communication node. The system and method include receiving, by the wireless communication device from the CU in response to transmitting the first message, a second message including MBMS scheduling information. The system and method include performing, by the wireless communication device, a handover procedure from the first DU to the second DU.

20 Claims, 28 Drawing Sheets

(56) References Cited

U.S. PATENT DOCUMENTS

| | | | |
|---|---|---|---|
| 2018/0183731 A1 | 6/2018 | Shousterman et al. | |
| 2018/0368109 A1 | 12/2018 | Kim | |
| 2019/0098604 A1 | 3/2019 | Park et al. | |
| 2019/0200414 A1 | 6/2019 | Abraham et al. | |
| 2019/0230564 A1 | 7/2019 | Kim et al. | |
| 2019/0387444 A1 | 12/2019 | Byun et al. | |
| 2021/0127351 A1 | 4/2021 | Stojanovski | |
| 2021/0160735 A1* | 5/2021 | Fujishiro | H04W 76/18 |
| 2022/0264572 A1 | 8/2022 | Li | |

FOREIGN PATENT DOCUMENTS

| | | |
|---|---|---|
| CN | 103428637 A | 12/2013 |
| CN | 106412848 A | 2/2017 |
| CN | 108696890 A | 10/2018 |
| CN | 109565860 A | 4/2019 |
| CN | 109982266 A | 7/2019 |
| CN | 110463236 A | 11/2019 |
| CN | 110463276 A | 11/2019 |
| EP | 3 484 193 A1 | 5/2019 |
| EP | 3 723 395 A1 | 10/2020 |
| WO | WO-2008/017272 A1 | 2/2008 |
| WO | WO-2019/129212 A1 | 7/2019 |

OTHER PUBLICATIONS

First Office Action for JP Appl. No. 2022-541818, dated Jun. 16, 2023 (with English translation, 8 pages).
Huawei, "(TP for MDT BL CR for TS 38.413): E2E delay measurement", 3GPP TSG-RAN3 Meeting #106, R3-197222, Nov. 22, 2019, Reno, Nevada (18 pages).
Qualcomm Incorporated, "Flow QoS Support in Dual Connectivity", 3GPP TSG-RAN WG3 #96, R3-171796, May 19, 2017, Hangzhou, China (3 pages).
Zte, "Adding reference architecture for the 5MBS", SA WG2 Meeting #S2-136AH, S2-2000936, Incheon, South Korea, Jan. 17, 2020 (4 pages).
First Examination Report on IN 202227038835 dated Jul. 5, 2023 (English translation included, 6 pages).
Extended European Search Report on EP Appl. No. 20890613.1 dated Mar. 2, 2023.
3rd Generation Partnership Project; Technical Specification Group Services and System Aspects; System architecture for the 5G System (5GS); Stage 2 (Release 16), 3GPP TS 23.501 V16.3.0 (Dec. 2019), 410 pages.
First Office Action and Search Report for CN App. No. 202080092475.1 dated Mar. 27, 2024 (with English translation, 14 pages).

Zhe, X., "Research and application of TD-LTE networking and Interference", Thesis Submitted to Nanjing University of Posts and Telecommunications for the Degree of Master of Engineering, Nov. 2015 (73 pages).
Huawei et al.: "System Information Support over VI interface" 3GPP TSG-RAN3 Meeting #98, R3-174430, Dec. 1, 2017; Reno, Nevada (4 pages).
International Search Report and Written Opinion for PCT Appl. No. PCT/CN2020/070242 dated Sep. 28, 2020 (8 pages).
Nokia et al.: "Discussion on System Information for WI" 3GPP TSG-RAN WG3#103; R3-190460; Mar. 1, 2019; Athens, Greece (4 pages).
NTT DOCOMO, Inc.: "High level overview of functions for LTE higher layer split" 3GPP TSG-RAN WG3 RAN3#102, R3-186613; Nov. 16, 2018; Spokane, WA, USA (11 pages).
AT&T: "Status update on Rel-17 5MBS work in 3GPP and potential impacts on public safety" 3GPP TSG-SA6 Meeting #34, S6-200059 Jan. 17, 2020(Jan. 17, 2020) Hyderbad, India (3 pages).
D. Vargas et al., "Broadcast and multicast Communication Enablers for the Fifth-Generation of Wireless Systems Deliverable D3.3 Ran Logical Architecture and Interfaces for 5G-Xcast", XP055685520, V.2.0, Feb. 28, 2019 (95 pages).
Extended European Search Report for EP Appl. No. 20886519.6, dated Dec. 5, 2022 (9 pages).
Huawei: "Delay Optimization for mobile TV modeSwitching"; 3GPP TSG-RAN WG RAN2 #57 R2-070735, Feb. 16, 2007; St Louis, US (12 pages).
Intel Corporation: "(TP for NR BL CR for TS 38.425): Correction for the handover issues in a separated CP/UP deployment" 3GPP TSG-RAN WG3 Meeting #101, R3-185071 Aug. 24, 2018(Aug. 24, 2018) Gothenburg, Sweden (7 pages).
International Search Report and Written Opinion for PCT Appl. No. PCT/CN2020/070986 dated Oct. 10, 2020 (8 pages).
International Search Report and Written Opinion for PCT Appl. No. PCT/CN2020/080821 dated Dec. 23, 2020 (8 pages).
ETSI TS 125 446; Universal Mobile Telecommunications System (UMTS); MBMS synchronisation protocol (Sync); (3GPP TS 25.446 version 15.0.0 Release 15), Jul. 2018 (22 pages).
ETSI TS 129 281; Universal Mobile Telecommunications System (UMTS); LTE; General Packet Radio System (GPRS) Tunnelling Protocol User Plane (GTPv1-U); (3GPP TS 29.281 version 15.3.0 Release 15), Jul. 2018 (34 pages).
ETSI TS 138 415; 5G; NG-RAN; PDU Session User Plane protocol (3GPP TS 38.415 version 15.2.0 Release 15), Apr. 2019 (14 pages).
First Office Action and Search Report for CN App. No. 202080091934.4 dated Jul. 18, 2024, (with English translation, 8 pages).

* cited by examiner

| Solutions | Opportunities of MBMS sending scheduling information | Ways of carrying MBMS scheduling information | On F1 interface | On Air interface | Solution Implementation |
|---|---|---|---|---|---|
| 1 | Before Handover | dedicated RRC messages | New F1 interface | dedicated RRC messages | Before Handover + New F1 message + dedicated RRC messages |
| 2 | After Handover | dedicated RRC messages | New F1 interface | dedicated RRC messages | After Handover + New F1 message + dedicated RRC messages |
| 3 | Before Handover | New SIB message | SYSTEM INFORMATION DELIVERY COMMAND | SIB | Before Handover + New SIB |
| 4 | After Handover | New SIB message | SYSTEM INFORMATION DELIVERY COMMAND | SIB | After Handover + New SIB |

FIG. 20

2400 receiving, by a central unit (CU) of a wireless communication node, from a wireless communication device through a first distributed unit (DU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node
2402 transmitting, by the CU to the wireless communication device, in response to receiving the first message, a second message including MBMS scheduling information
2404 causing the wireless communication device to perform a handover procedure from the first DU to the second DU
2406

FIG. 24

2700 receiving, by central unit (CU) of a wireless communication node, from a wireless communication device through a first distributed unit (DU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node
2702 transmitting, by the CU to the wireless communication device, in response to determining that the wireless communication device has performed a handover procedure from the first DU to the second DU, a second message including MBMS scheduling information
2704

FIG. 27

SYSTEM AND METHOD FOR MANAGING MULTIMEDIA BROADCAST MULTICAST SERVICE (MBMS) CONTINUITY

CROSS-REFERENCE TO RELATED APPLICATION

This application claims the benefit of priority under 35 U.S.C. § 120 as a continuation of PCT Patent Application No. PCT/CN2020/070242, filed on Jan. 3, 2020, the disclosure of which is incorporated herein by reference in its entirety.

TECHNICAL FIELD

The disclosure relates generally to wireless communications and, more particularly, to systems and methods for managing Multimedia Broadcast Multicast Service (MBMS) continuity.

BACKGROUND

MBMS (Multimedia Broadcast Multicast Service) is a point-to-multipoint interface specification for use in 3GPP cellular networks. It is the cornerstone of the mobile television business to provide efficient Broadcast and Multicast services in the cellular and core networks. For broadcast transmission across cell lines, MBMS defines the transmission mode using a single-frequency network configuration. As mobile communication enters the LTE stage, MBMS technology evolves into eMBMS (Enhanced Multimedia Broadcast Multicast Service) in 4G communication to meet the growing business demand.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

The present disclosure is directed to systems and method for managing Multimedia Broadcast Multicast Service (MBMS) continuity.

In general, as discussed in greater detail below, an MBMSInterestIndication message reported by a UE may include a list of services of UE interest (ServicesListMBMS) and sorted by priority. The CU may add the procedure of transferring MBMS scheduling information to the UE, prior to the UE being handed over to the target cell, that is, before receiving UE CONTEXT SETUP RESPONSE from the target DU. Alternatively, the CU may add the procedure of transferring MBMS scheduling information to the UE after the UE is handed over to the target cell, that is, after receiving the UL RRC MESSAGE TRANSFER message from the target DU.

The MBMS scheduling information may be carried in a new (e.g., fresh, updated, different, etc.) SIB message. The MBMS scheduling information may be carried through a dedicated RRC message and forwarded on an F1 interface and/or air interface to UE. The MBMS scheduling information may be carried by a new F1 interface message to source DU.

One aspect disclosed herein is directed to a method for managing Multimedia Broadcast Multicast Service (MBMS) continuity. In some embodiments, the method includes transmitting, by a wireless communication device through a first distributed unit (DU) of a wireless communication node to a central unit (CU) of the wireless communication node, a first message. In some embodiments, the first DU corresponds to a first subset of a plurality of Multimedia Broadcast Multicast Service (MBMS) services of the CU. The first message indicates a second subset of the plurality of MBMS services that corresponds to a second DU of the wireless communication node. In some embodiments, the method also includes receiving, by the wireless communication device from the CU in response to transmitting the first message, a second message including MBMS scheduling information. In some embodiments, the method also includes performing, by the wireless communication device, a handover procedure from the first DU to the second DU.

In some embodiments, the first message includes an MBMSInterestIndication message. In some embodiments, the MBMSInterestIndication message includes a list of MBMS services that the wireless communication device is receiving and interested in. In some embodiments, each of the MBMS services being associated with a respective service identifier.

In some embodiments, receiving a second message further comprises receiving, from the first DU, the MBMS scheduling information via a dedicated RRC message. In some embodiments, the MBMS scheduling information is transmitted from the CU to the first DU via a newly defined F1-interface message.

In some embodiments, receiving a second message further comprises receiving, from the first DU, the MBMS scheduling information via a newly defined system information block (SIB), in response to the first DU receiving a SYSTEMINFORMATION DELIVERY COMMAND from the CU.

Another aspect disclosed herein is directed to a method for managing Multimedia Broadcast Multicast Service (MBMS) continuity. In some embodiments, the method includes receiving, by a central unit (CU) of a wireless communication node, from a wireless communication device through a first distributed unit (DU) of the wireless communication node, a first message. In some embodiments, the first DU corresponding to a first subset of a plurality of Multimedia Broadcast Multicast Service (MBMS) services of the CU. In some embodiments, the first message indicates a second subset of the plurality of MBMS services that corresponds to a second DU of the wireless communication node. In some embodiments, the method includes transmitting, by the CU to the wireless communication device, in response to receiving the first message, a second message including MBMS scheduling information. In some embodiments, the method includes causing the wireless communication device to perform a handover procedure from the first DU to the second DU.

In some embodiments, the first message includes an MBMSInterestIndication message. In some embodiments, the MBMSInterestIndication message includes a list of MBMS services that the wireless communication device is receiving and interested in. In some embodiments, each of the MBMS services being associated with a respective service identifier.

In some embodiments, transmitting a second message further comprises transmitting, by the CU to the first DU, a newly defined F1-interface message including the MBMS scheduling information, which causes the first DU to transmit the MBMS scheduling information to the wireless communication device via a dedicated RRC message.

In some embodiments, transmitting a second message further comprises transmitting, by the CU to the first DU, a SYSTEMINFORMATION DELIVERY COMMAND, which causes the first DU to transmit the MBMS scheduling information via a newly defined system information block (SIB).

Another aspect disclosed herein is directed to a method for managing Multimedia Broadcast Multicast Service (MBMS) continuity. In some embodiments, the method includes receiving, by first distributed unit (DU) of a wireless communication node from a wireless communication device, a first message. In some embodiments, the first DU corresponds to a first subset of a plurality of Multimedia Broadcast Multicast Service (MBMS) services of the CU. In some embodiments, the first message indicates a second subset of the plurality of MBMS services that corresponds to a second DU of the wireless communication node. In some embodiments, the method includes transferring, by the first DU to a central unit (CU) of the wireless communication node, the first message. In some embodiments, the method includes receiving, by the first DU from the DU, a second message. In some embodiments, the method includes transmitting, by the first DU to the wireless communication device, in response to receiving the second message, a third message including MBMS scheduling information, which causes the wireless communication device to perform a handover procedure from the first DU to the second DU.

In some embodiments, the first message includes an MBMSInterestIndication message. In some embodiments, the MBMSInterestIndication message includes a list of MBMS services that the wireless communication device is receiving and interested in. In some embodiments, each of the MBMS services being associated with a respective service identifier.

In some embodiments, receiving a second message further comprises receiving, by first DU from the CU, a newly defined F1-interface message including the MBMS scheduling information. In some embodiments, transmitting a third message including the MBMS scheduling information further comprises transmitting, by the first DU to the wireless communication device, the MBMS scheduling information via a dedicated RRC message.

In some embodiments, receiving a second message further comprises receiving, by first DU from the CU, a SYSTEMINFORMATION DELIVERY COMMAND. In some embodiments, transmitting a third message including the MBMS scheduling information further comprises transmitting, by the first DU to the wireless communication device, the MBMS scheduling information via a newly defined system information block (SIB).

Another aspect disclosed herein is directed to a method for managing Multimedia Broadcast Multicast Service (MBMS) continuity. In some embodiments, the method includes transmitting, by a wireless communication device through a first distributed unit (DU) of a wireless communication node to a central unit (CU) of the wireless communication node, a first message. In some embodiments, the first DU corresponds to a first subset of a plurality of Multimedia Broadcast Multicast Service (MBMS) services of the CU. In some embodiments, the first message indicates a second subset of the plurality of MBMS services that corresponds to a second DU of the wireless communication node. In some embodiments, the method includes performing, by the wireless communication device, a handover procedure from the first DU to the second DU. In some embodiments, the method includes receiving, by the wireless communication device from the CU in response to performing the handover procedure, a second message including MBMS scheduling information.

In some embodiments, the first message includes an MBMSInterestIndication message. In some embodiments the MBMSInterestIndication message includes a list of MBMS services that the wireless communication device is receiving and interested in. In some embodiments, each of the MBMS services being associated with a respective identifier.

In some embodiments, receiving a second message further comprises receiving, from the first DU, the MBMS scheduling information via a dedicated RRC message. In some embodiments, the MBMS scheduling information is transmitted from the CU to the first DU via a newly defined F1-interface message. In some embodiments, receiving a second message further comprises receiving, from the first DU, the MBMS scheduling information via a newly defined system information block (SIB), in response to the first DU receiving a SYSTEMINFORMATION DELIVERY COMMAND from the CU.

Another aspect disclosed herein is directed to a method for managing Multimedia Broadcast Multicast Service (MBMS) continuity. In some embodiments, the method includes receiving, by a central unit (CU) of a wireless communication node, from a wireless communication device through a first distributed unit (DU) of the wireless communication node, a first message. In some embodiments, the first DU corresponds to a first subset of a plurality of Multimedia Broadcast Multicast Service (MBMS) services of the CU, the first message indicating a second subset of the plurality of MBMS services that corresponds to a second DU of the wireless communication node. In some embodiments, the method includes transmitting, by the CU to the wireless communication device, in response to determining that the wireless communication device has performed a handover procedure from the first DU to the second DU, a second message including MBMS scheduling information.

In some embodiments, the first message includes an MBMSInterestIndication message. In some embodiments, the MBMSInterestIndication message includes a list of MBMS services that the wireless communication device is receiving and interested in. In some embodiments, each of the MBMS services being associated with a respective service identifier.

In some embodiments, transmitting a second message further comprises transmitting, by the CU to the first DU, a newly defined F1-interface message including the MBMS scheduling information, which causes the first DU to transmit the MBMS scheduling information to the wireless communication device via a dedicated RRC message.

In some embodiments, a second message further comprises transmitting, by the CU to the first DU, a SYSTEM-INFORMATION DELIVERY COMMAND, which causes the first DU to transmit the MBMS scheduling information via a newly defined system information block (SIB).

Another aspect disclosed herein is directed to a method for managing Multimedia Broadcast Multicast Service (MBMS) continuity. In some embodiments, the method includes receiving, by first distributed unit (DU) of a wireless communication node from a wireless communication device, a first message. In some embodiments, the first DU corresponding to a first subset of a plurality of Multimedia Broadcast Multicast Service (MBMS) services of the CU. The first message indicating a second subset of the plurality of MBMS services that corresponds to a second DU of the wireless communication node. In some embodiments, the method includes transferring, by the first DU to a central unit (CU) of the wireless communication node, the first message. In some embodiments, the method includes receiving, by the first DU from the DU, subsequently to the wireless communication device performing a handover procedure from the first DU to the second DU, a second message. In some embodiments, the method includes transmitting, by the first DU to the wireless communication device, in response to receiving the second message, a third message including MBMS scheduling information.

In some embodiments, the first message includes an MBMSInterestIndication message. In some embodiments, the MBMSInterestIndication message includes a list of MBMS services that the wireless communication device is receiving and interested in. In some embodiments, each of the MBMS services being associated with a respective service identifier.

In some embodiments, receiving a second message further comprises receiving, by first DU from the CU, a newly defined F1-interface message including the MBMS scheduling information. In some embodiments, transmitting a third message including the MBMS scheduling information further comprises transmitting, by the first DU to the wireless communication device, the MBMS scheduling information via a dedicated RRC message.

In some embodiments, receiving a second message further comprises receiving, by first DU from the CU, a SYSTEMINFORMATION DELIVERY COMMAND. In some embodiments, transmitting a third message including the MBMS scheduling information further comprises transmitting, by the first DU to the wireless communication device, the MBMS scheduling information via a newly defined system information block (SIB).

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 20 illustrates a table of solutions (embodiments) of Service Continuity Receiving for RRC_CONNECTED UE, in accordance with some embodiments of the present disclosure.

FIG. 24 is a flow diagram depicting a method for managing Multimedia Broadcast Multicast Service (MBMS) continuity, in accordance with some embodiments of the present disclosure.

FIG. 27 is a flow diagram depicting a method for managing Multimedia Broadcast Multicast Service (MBMS) continuity, in accordance with some embodiments of the present disclosure.

DETAILED DESCRIPTION OF EXEMPLARY EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
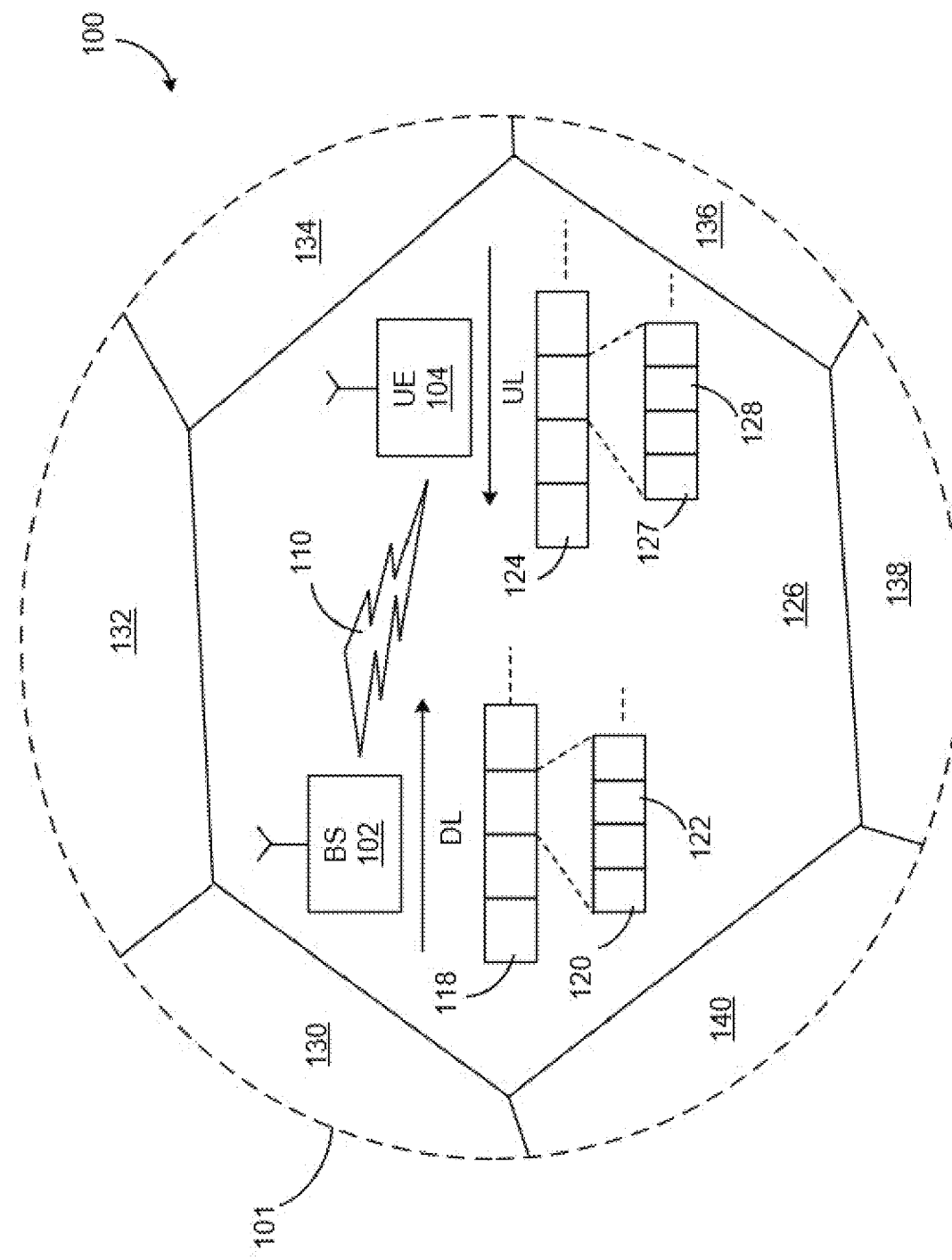
FIG. 1 illustrates an example cellular communication network in which techniques disclosed herein may be implemented, in accordance with an embodiment of the present disclosure.

The following acronyms are used throughout the present disclosure:

3GPP 3rd Generation Partnership Project
5G 5th Generation Mobile Networks
5G-AN 5G Access Network
5G gNB Next Generation NodeB
5G NR 5th Generation Mobile Networks New Radio
BMSC Broadcast/Multicast Service Centre
CC Component Carrier
CGI Cell Global Identity
CP Control-Plane
CU Centralized Unit
DCCH Dedicated Control Channel
DU Distributed Unit
eMBMS Enhanced Multimedia Broadcast Services
EUTRAN Evolved Terrestrial Radio Access Network
gNB-CU gNB-Centralized Unit
gNB-DU gNB-Distributed Unit
gNB gNodeB
GPRS General Packet Radio Service
GTP-U GPRS Tunneling Protocol-User Plane Header
IP Internet Protocol
LTE Long Term Evolution
MAC-CE Medium Access Control-Control Element
MBMS Multimedia Broadcast Services
MBMS-GW Multimedia Broadcast Multicast Service Gateway
MBS Mobile Network Multicast/Broadcast Service
MCCH Multicast Control Channel
NG-RAN Next Generation Radio Access Network
PCI Physical Cell Identifier
PDCP Packet Data Convergence Protocol
PDSCH Physical Downlink Shared Channel
PDU Protocol Data Unit
RAN Radio Access Network
RAT Radio Access Technology
RLC Radio Link Control
RRC Radio Resources Control\
RSRP Reference Signal Receive Power
RSRQ Reference Signal Received Quality
SAI Service Area Identifier
SDAP Service Data Adaption Protocol
SDU Service Data Unit
SIB System Information Block
SRBI Signal Radio Bearer
T-PDU Protocol Data Unit
TMGI Temporary Mobile Group Identifier
TMGL Temporary Mobile Group Identifier
TNL Transport Network Layer
UDP User Datagram Protocol
UE User Equipment
UP User-Plane
USD User Service Description 1. Mobile Communication Technology and Environment FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
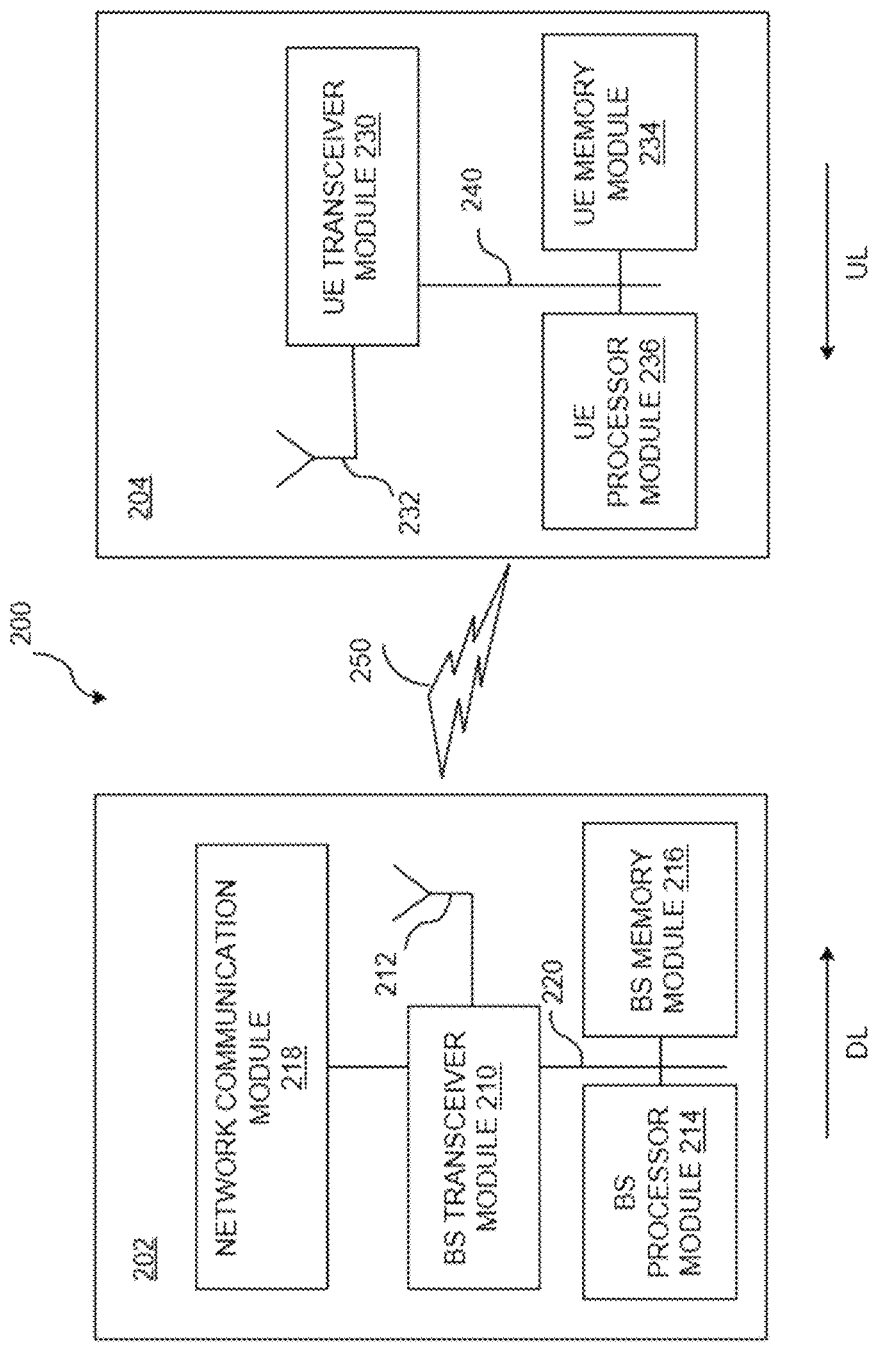
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Control (PDCL) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Overview of Multimedia Broadcast Multicast Service

MBMS (Multimedia Broadcast Multicast Service) is a point-to-multipoint interface specification for use in 3GPP cellular networks. It is the cornerstone of the mobile television business to provide efficient Broadcast and Multicast services in the cellular and core networks. For broadcast transmission across cell lines, MBMS defines the transmission mode using a single-frequency network configuration. As mobile communication enters the LTE stage, MBMS technology evolves into eMBMS (Enhanced Multimedia Broadcast Multicast Service) in 4G communication to meet the growing business demand.

Enhanced Multimedia Broadcast Services (eMBMS) can provide users with personalized, customized, and various data services in the form of texts, images, audio, and video. For mobile data service bearers, eMBMS has the biggest advantage that it can saves air interface resources and reduces network operation costs when there are more users' business demands in the service area. It has two modes: broadcast hosting and multicast hosting. Broadcast bearers are applicable to live broadcast, government emergency information, and multimedia advertisement push scenarios. Multicast bearers are applicable to customized content requirements, such as VOD and download.

Depending on different service activities, the user equipment (UE) receiving the MBMS service can be in one of the following three RRC states: Radio Resources Control (RRC) connected state (RRC_CONNECTED), RRC IDLE (RRC idle state) and RRC Inactive (RRC inactive state). In the RRC_CONNECTED state, the RRC context has been established, and all the parameters required for the communication between the terminal and the wireless access network are known for both. In the RRC IDLE state, there is no RRC context in the wireless access network—that is, there is no parameter for the communication between the terminal and the network. At this time, the terminal does not belong to any cell. In the RRC INACTIVE state, the RRC context is kept in the terminal and the base station. Another important difference between different statuses is the related mobility mechanism. For UEs in idle and inactive state, mobility is processed by UEs through cell reselection. For UEs in connected mode, mobility is managed by the radio access network, meaning that the network side plays a leading role in handover decision and target cell selection. The measurement reports and other information reported by the UE are used as a reference for the source eNodeB to make handover decisions.

In LTE network with multiple frequencies, the eMBMS service may be provided through multiple frequencies. In the 3GPP R11 version standard, the content supporting eMBMS service continuity may be added. By obtaining the information in the SIB 15 on the PDSCH (Physical Downlink Shared Channel), the User Equipment (UE) may be able to understand the frequency and location of the interested services, and may guide the UE to find the interested services on other frequencies. The SIB15 may contain the ID (e.g., Service Area Identities, SAIs) list of the MBMS service area where the current service frequency is located, the adjacent frequency list of MBMS service and the corresponding MBMS SAIs, and/or the MBMS SAIs list of the specific frequency.

When an LTE UE in an idle state enters the overlapping area covered by eNodeB and needs to be handover, the UE may determine the target cell based on the measurement result. To avoid the delay caused by reading related eMBMS information on adjacent frequencies on the SIB 13 and MCCH messages, the network may combine the User Service Description (USD) information and SIB 15 information to offer the eMBMS services provided on different frequencies to the UE. In the USD, each service has its Service Identity (Service Identity), including TMGI (Temporary Mobile Group Identity) and/or frequency of MBMS service area and SAI. The SIB 15 may contain a list containing the current frequency and/or adjacent frequency. Each frequency may contain a list of some or all SAIs supported by this frequency. By combining the information on the USD and SIB15, the UE may be able find the frequency at which it can provide its current services or the services that it is interested in.

The information obtained from USD and SIB 15 is very important. When an UE leaves a cell in idle state, the UE can handover to the cell that can provide the required eMBMS service frequency in accordance with priority. In this way, the eMBMS service continuity can be maintained as long as the UE provides the required services at an adjacent frequency.

In RRC_CONNECTED state, the UE that is receiving the eMBMS service or is interested in the eMBMS service may send a measurement report and/or an RRC message (MBMS InterestIndicator) in response to the SIB 15 message. This message may contain the frequency list of the eMBMS service that the UE is currently receiving or interested in, and/or contain a feature bit that notifies the current cell that the UE wants to receive the eMBMS service or unicast service. The current eNodeB may select a target cell for the UE through the information. The candidate cell that can provide proper eMBMS services on any frequency may be at the highest priority of this frequency. When this cell is taken as the target cell, the UE may continue to receive the services of interest from this frequency.

3. Types of UE Handovers in the RRC_CONNECTED State

The type of UE handovers in the RRC_CONNECTED state may be divided into two different types: (1) Based on Radio Access Technology (RAT) Coverage Based Handover and (2) Based on Carrier Frequency—Based Handover 3.1 Based on Radio Access Technology (RAT) Coverage Based Handover This type may include an Intra-System handover (Intra-NR) consisting of an Intra-gNB handover (e.g., a handover between two cells under the same gNB) and/or an Inter-gNB handover (e.g., a handover between two cells under different gNB).

This type may include an Inter-System handover (Inter RAT) consisting of a handover between 5G NR and other systems.

3.2 Based on Carrier Frequency—Based Handover

This type may include an Intra-frequency handover and an Inter-frequency handover 4. Logical Architecture of a 5G New Radio (NR) gNB For 5G stand-alone (SA) deployment, the logical architecture of gNB adopts separation of Centralized unit (CU) and Distributed unit (DU).

Figure 3:
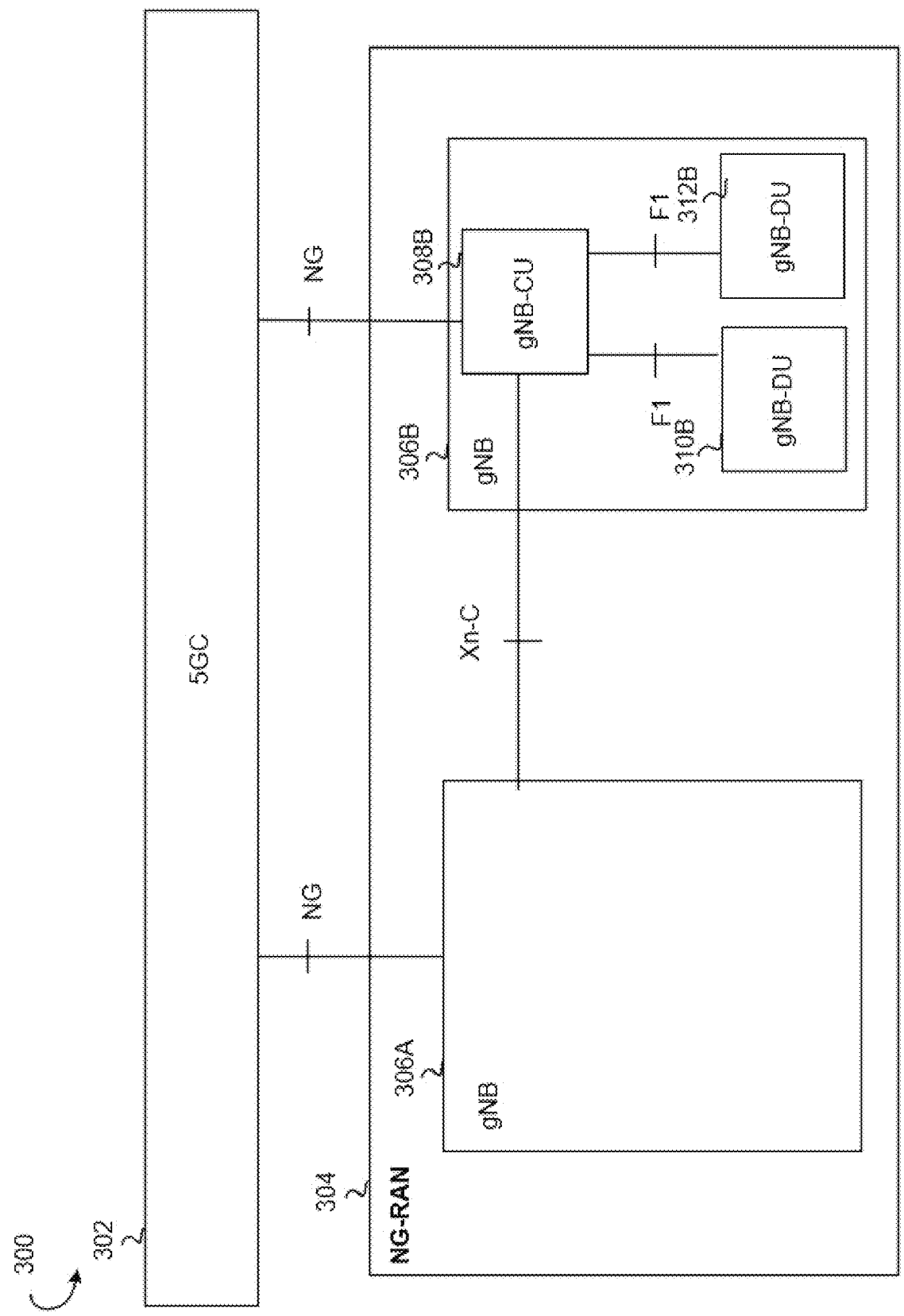
FIG. 3 illustrates block diagrams of an example NG-RAN architecture, in accordance with some embodiments of the present disclosure.

FIG. 3 illustrates a block diagram of an example NG-RAN architecture, in accordance with some embodiments of the present disclosure. The environment 300 includes a 5GC 302 and an NG-RAN 304. The NG-RAN 304 includes a gNB 306A and a gNB 306B. In some embodiments, each gNB 306A, 306B may a wireless communication node, such as BS 102 in FIG. 1.

The gNB 306A includes a gNB-CU 308A (not shown in FIG. 3), a gNB-DU 310A (not shown in FIG. 3), and a gNB-DU 312A (not shown in FIG. 3). The gNB-DU 310A and gNB-DU 312A are connected to the gNB-CU 308A via an F1 logical interface.

The gNB 306B includes a gNB-CU 308B, a gNB-DU 310B, and a gNB-DU 312B. The gNB-DU 310B and gNB-DU 312B are connected to the gNB-CU 308B via an F1 logical interface.

Although each gNB 306A, 306B is shown in FIG. 3 as including only one gNB-CU and two gNB-DUs, each gNB 306A, 306B may include any number of gNB-CUs and two gNB-DUs. The environment 300 may also include any number of NG-RANs 304.

The gNB-CUs and gNB-DUs are separated in accordance with the real-time requirements of different protocol layers. In such a principle, the physical layer with high real-time requirements, MAC layer, and the RLC layer are processed in the DU, and the PDCP layer and SDAP layer with low real-time requirements are processed in the CU.

Figure 4:
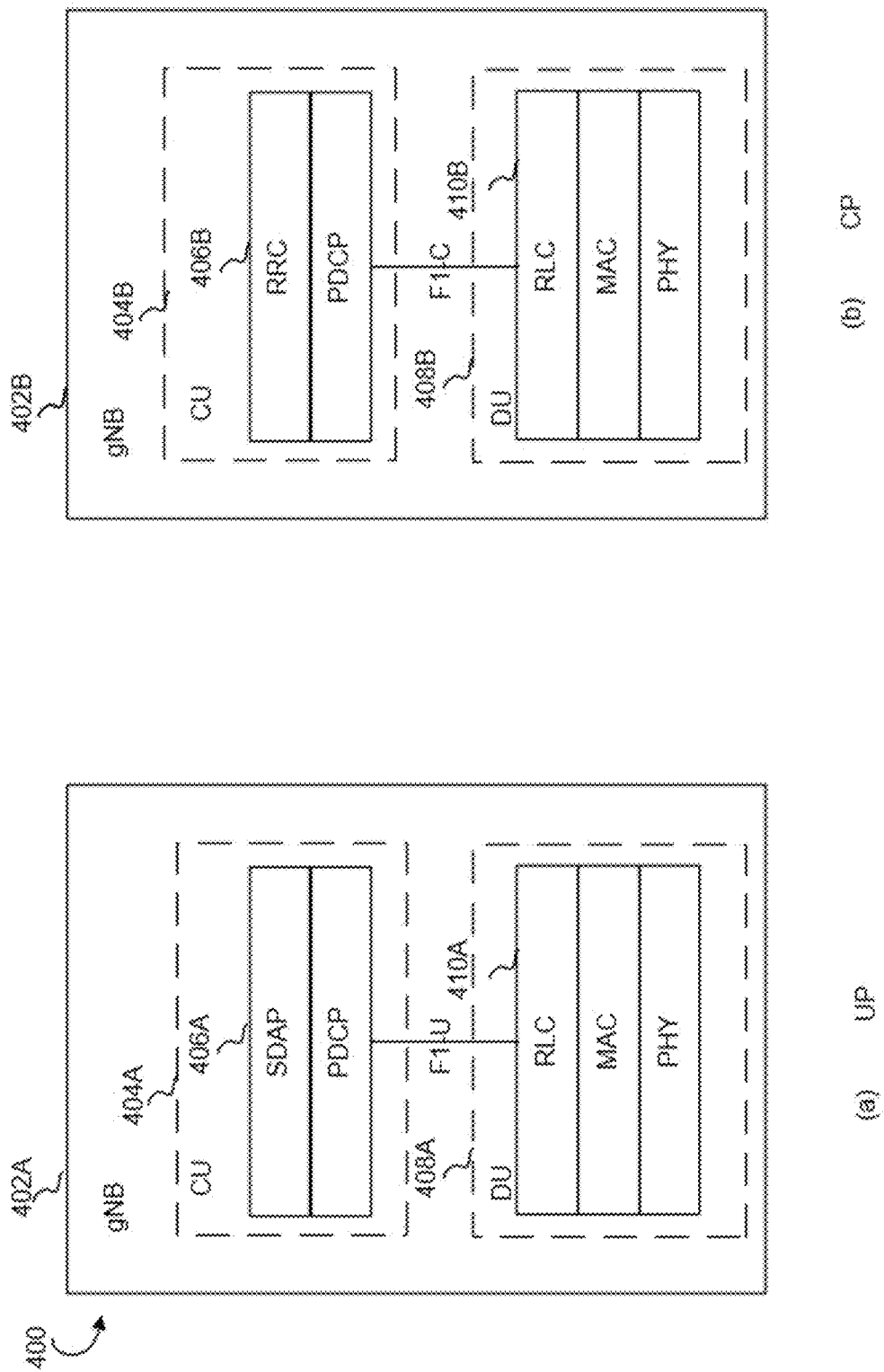
FIG. 4 illustrates a block diagram of an example protocol of NR-RAN CU-DU split architecture, in accordance with some embodiments of the present disclosure.

FIG. 4 illustrates a block diagram of an example protocol of NR-RAN CU-DU split architecture, in accordance with some embodiments of the present disclosure. That is, FIG. 4 shows the protocol stack of the user plane and control plane of the NG-RAN CU-DU separation architecture. The environment 400 includes a gNB 402A associated with a UP (User-Plane) Function and a gNB 402B associated with a CP (Control-Plane) Function. In some embodiments, each gNB 402A, 402B may a wireless communication node, such as BS 102 in FIG. 1.

The gNB 402A includes a CU 404A and a DU 408A. The CU 404A includes a protocol stack 406A consisting of an SDAP layer and a PDCP layer. The DU 408A includes a protocol stack 410A consisting of an RLC layer, a MAC layer, and a PHY layer. The CU 404A is connected to the DU 408A via an F1 logical interface.

The gNB 402B includes a CU 404B and a DU 408B. The CU 404B includes a protocol stack 406B consisting of an RRC layer and a PDCP layer. The DU 408B includes a protocol stack 410B consisting of an RLC layer, a MAC layer, and a PHY layer. The CU 404B is connected to the DU 408B via an F1 logical interface.

Figure 5:
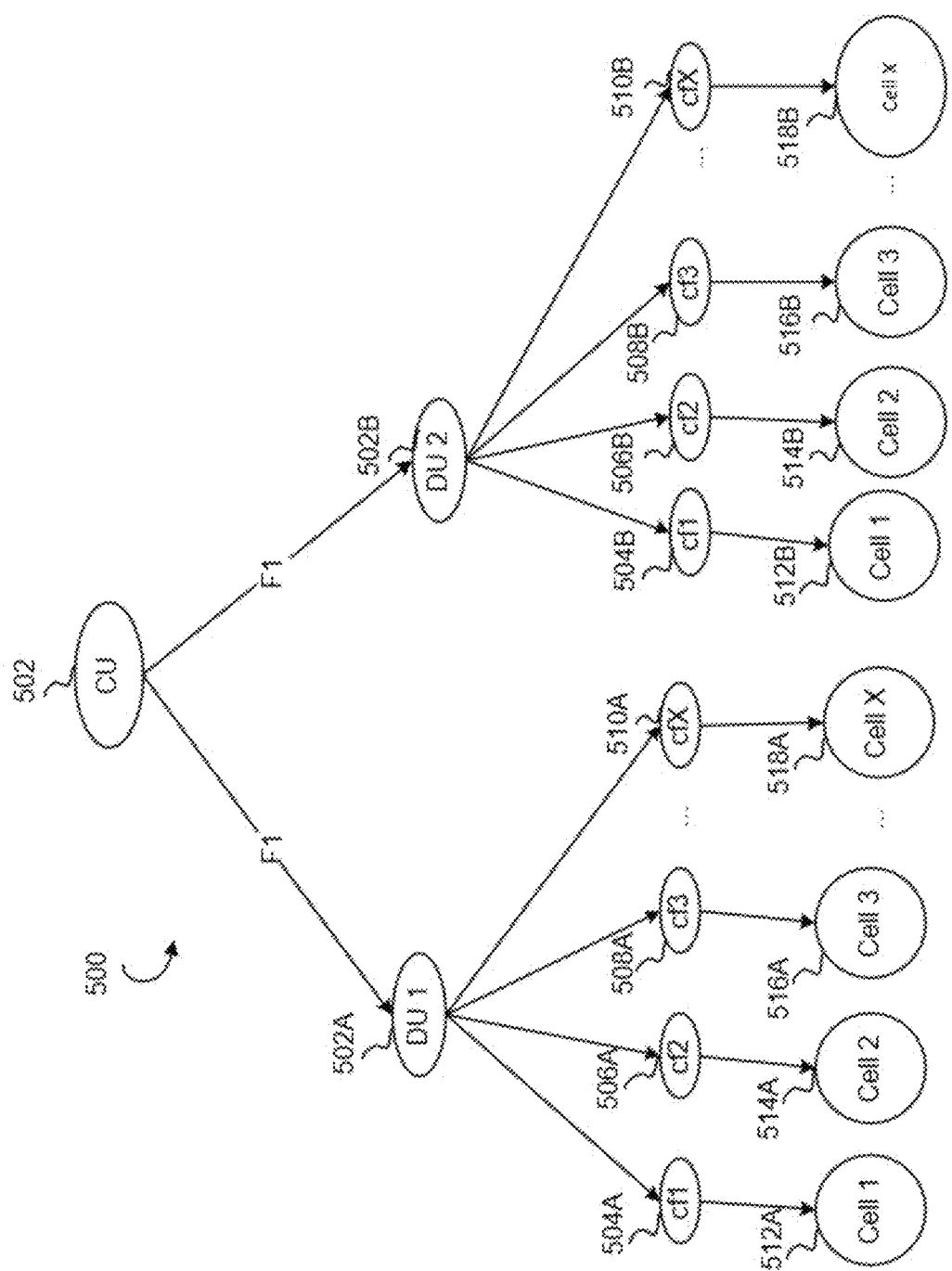
FIG. 5 illustrates a block diagram of an example structure of an inter-DU, in accordance with some embodiments of the present disclosure.

FIG. 5 illustrates a block diagram of an example structure of an inter-DU, in accordance with some embodiments of the present disclosure. The environment 500 includes a CU 502 connected to a DU 502A (shown in FIG. 5 as "DU 1") and a DU 502B (shown in FIG. 5 as "DU 2").

The DU 502A is connected to a CF 504A (shown in FIG. 5 as "CF1"), a CF 506A (shown in FIG. 5 as "CF2"), a CF 508A (shown in FIG. 5 as "CF3"), up to a CF 510A (shown in FIG. 5 as "CFX"). That is, DU 502A may be connected to any number of CFs.

The DU 502B is connected to a CF 504B (shown in FIG. 5 as "CF1"), a CF 506B (shown in FIG. 5 as "CF2"), a CF 508B (shown in FIG. 5 as "CF3"), up to a CF 510B (shown in FIG. 5 as "CFX"). That is, DU 502B may be connected to any number of CFs.

Figure 6:
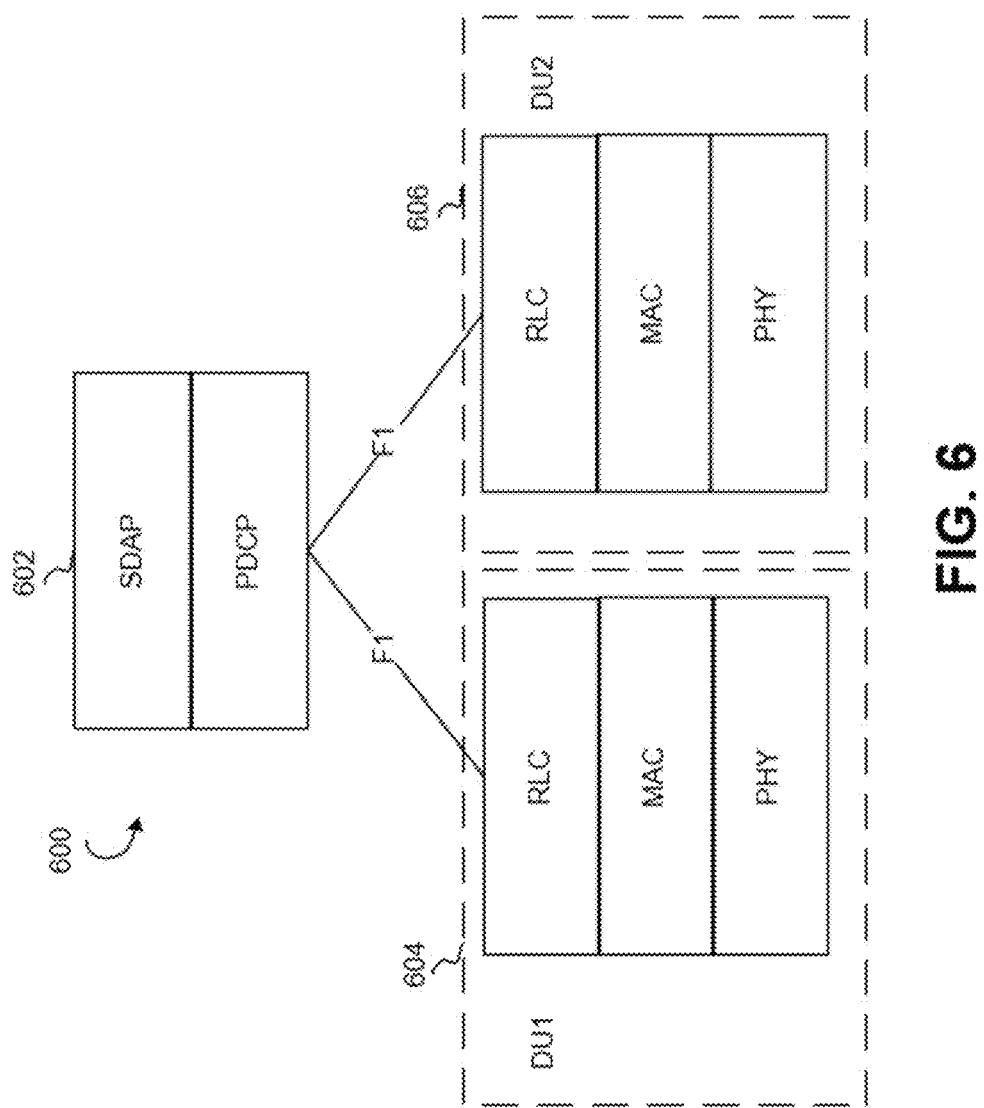
FIG. 6 illustrates a block diagram of an example structure of an inter-DU Protocol, in accordance with some embodiments of the present disclosure.

FIG. 6 illustrates a block diagram of an example structure of an inter-DU Protocol, in accordance with some embodiments of the present disclosure. The environment 600 includes a protocol stack 602 that is connected to a DU 604 (shown in FIG. 6 as "DU 1") via an F1 logical interface and a DU 606 (shown in FIG. 6 as "DU 2") via an F1 logical interface.

The DU 604 includes a protocol stack consisting of an SDAP layer and a PDCP layer. The DU 606 includes a protocol stack consisting of an RLC layer, a MAC layer, and a PHY layer.

With reference to FIG. 5 and FIG. 6, for the NG RAN CU-DU separation architecture, UE mobility falls into two categories: Cross-CU mobility (referred to herein as, "Inter-CU Mobility") and mobility under the same CU (referred to herein as, "Intra-DU Mobility"). The application scope of this patent on service continuity assurance for broadcast and multicast is cell handover under the same CU. The specific deployment structure is shown in FIG. 5A. Each DU has several carriers frequency (cfX), each of which corresponds to a cell.

4. UE Reporting Procedure—MeasurementReport Message

Figure 7:
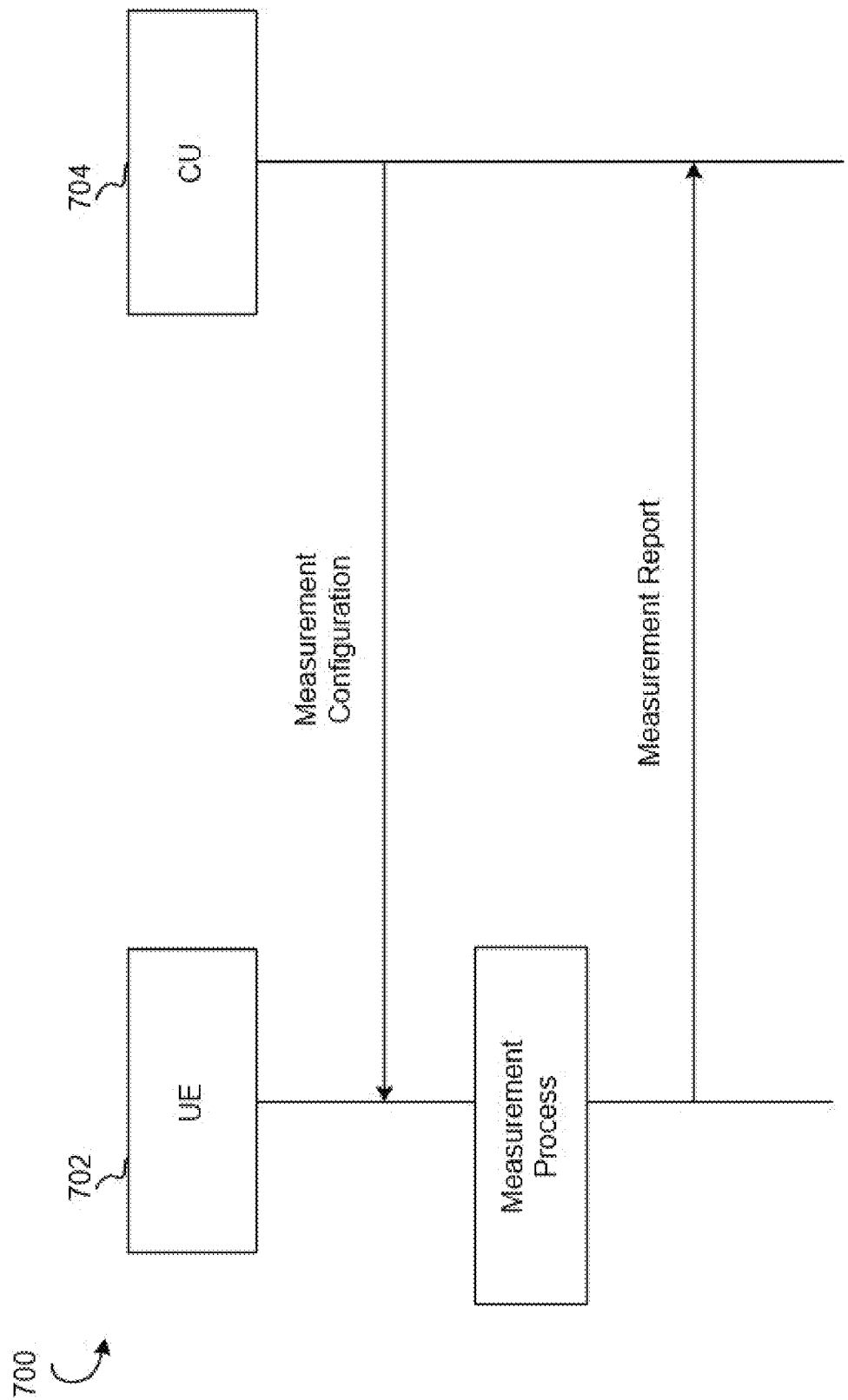
FIG. 7 illustrates a flow diagram of an example measurement process, in accordance with some embodiments of the present disclosure.

FIG. 7 illustrates a flow diagram of an example measurement process, in accordance with some embodiments of the present disclosure. The measurement process involves communication between a UE 702 (e.g., UE 102 in FIG. 1) and a CU 704.

If the UE 702 detects that the measurement result meets the triggering conditions of the measurement event, it generates a measurement report and reports it to the CU 704. The measurement report message is carried by the MeasurementReport message, which is an RRC message. The message contains one or more of the following measurement results: a Measurement report ID, a PCI, a CGI, and an RSRP & RSRQ.

Before a UE 702 sends a measurement report, the CU 704 delivers the measurement configuration. After receiving the measurement configuration, the UE 702 performs the measurement in accordance with the detailed measurement configuration.

5. UE Reporting Procedure—MBMSInterestIndication Message

The MBMSInterestIndication message is sent by the UE (e.g., UE 102 in FIG. 1) to the CU (e.g., CU 704 in FIG. 7) via the Source DU, informing the MBMS services to UE that is receiving or interested in. This message contains the list of services (e.g., ServicesListMBMS) that the UE is receiving or interested in. Each service is uniquely identified by TMGI.

The configuration of the MBMSInterestIndication message and related IEs included are as follows:

MBMSInterestIndication message
        Signaling radio bearer: SRB1
        RLC-SAP: AM
        Logical channel: DCCH
        Direction: UE to CU mentReport message) and MBMS interest indication (e.g., an MBMSInterestIndication message). The decision procedures are as follows:

In a first operation, the source cell lists the priority order of the target cell in accordance with the UE measurement report and MBMS interest indication.

In a second operation, select the target cell that meets the signal quality requirements as the candidate cell.

In a third operation, select the cells from the candidate cells that support the MBMS service that the UE is receiving or interested in according to the priority sequence. The cell is the target cell.

In a fourth operation, if the candidate cell cannot provide the MBMS service that the UE is receiving or is interested in, the cell with the highest priority is selected as the target cell.

7. UE Context Setup and Management

Figure 10:
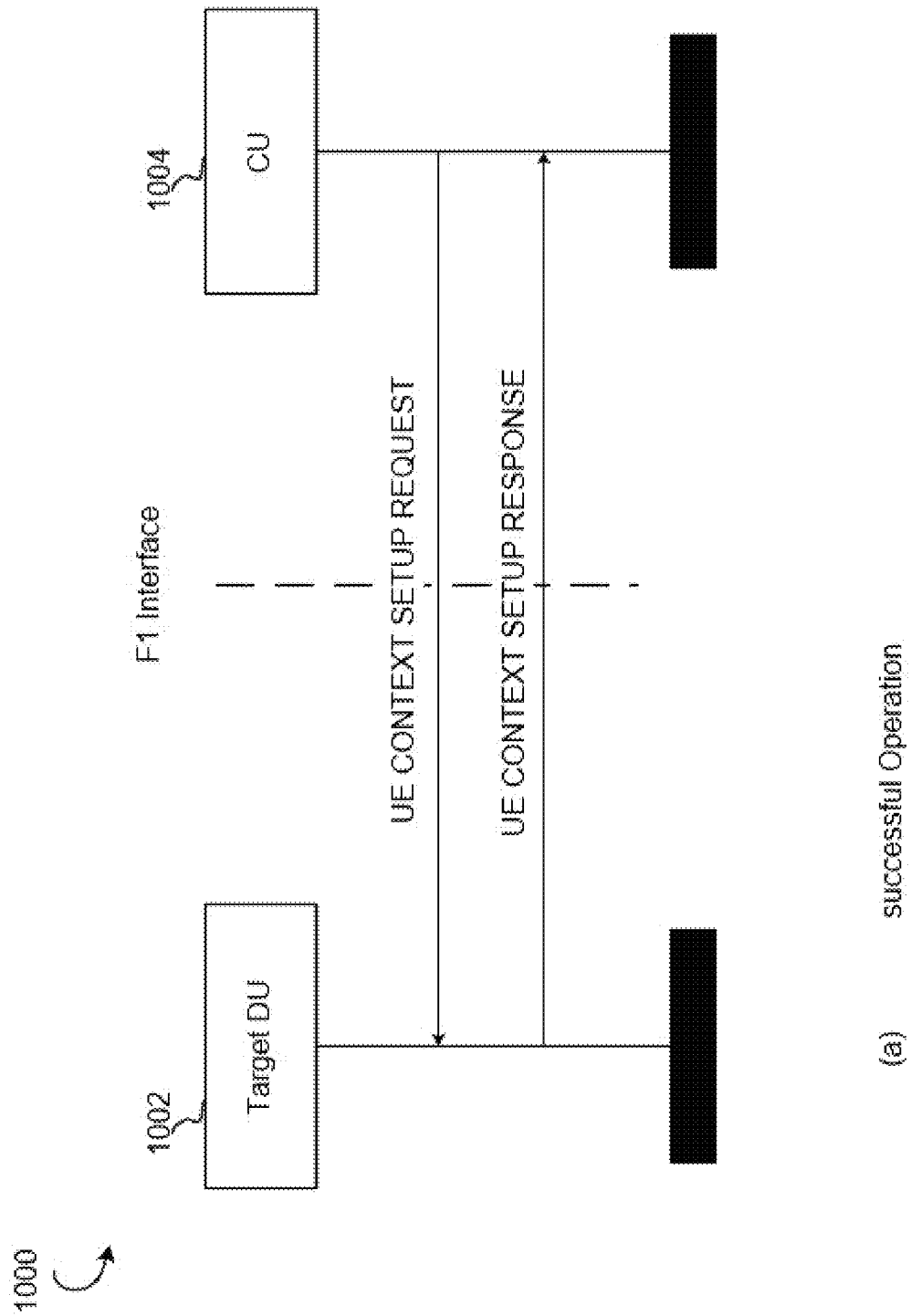
FIG. 10 illustrates a flow diagram of an example successful operation of a UE Context Setup Request procedure, in accordance with some embodiments of the present disclosure.

FIG. 10 illustrates a flow diagram of an example successful operation of a UE Context Setup Request procedure, in accordance with some embodiments of the present disclosure. The flow diagram 1000 includes a Target DU 1002 and a CU 1004 that communicate with one another via an F1 interface.

| EXAMPLE MBMSInterestIndication MESSAGE |
|---|
| -- ASN1START |
| MBMSInterestIndication ::=    SEQUENCE { |
|     criticalExtensions                         CHOICE { |
|         c1                                            CHOICE { |
|             interestIndication                  MBMSInterestIndication-IEs, |
|             spare3 NULL, spare2 NULL, spare1 NULL |
|     }, |
|     criticalExtensionsFuture              SEQUENCE { } |
|     } |
| } |
|     MBMSInterestIndication-IEs ::=    SEQUENCE { |
|     mbms-Services                  ServicesListMBMS          OPTIONAL, |
|     ... |
| } |

Figure 8:
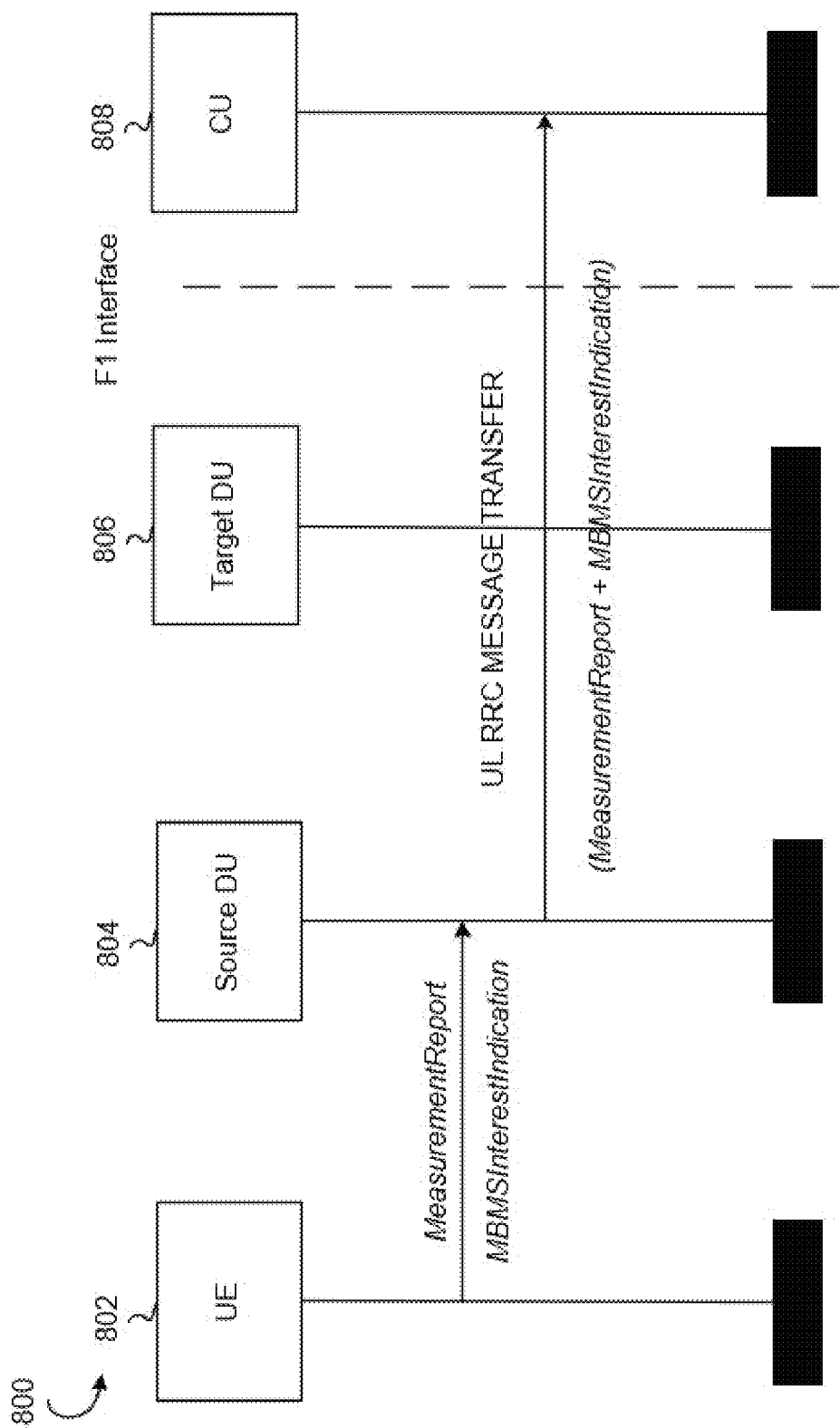
FIG. 8 illustrates a flow diagram of an example UE reporting process, in accordance with some embodiments of the present disclosure.

FIG. 8 illustrates a flow diagram of an example UE reporting process, in accordance with some embodiments of the present disclosure. The flow diagram 800 includes a UE 802 (e.g., UE 102 in FIG. 1), a Source DU 804, a Target DU 806, and a CU 808.

When the measurement result meets the triggering condition of the measurement event or UE 102 changes its interest MBMS service, the MBMSInterestIndication message and Measurement Report are simultaneously forwarded to the CU 808 through the F1 interface via the source DU 804, as shown in FIG. 8. In response, the Source DU 804 sends the Measurement Report and the MBMSInterestIndication message to the CU 808 via an UL RRC Message Transfer.

Figure 9:
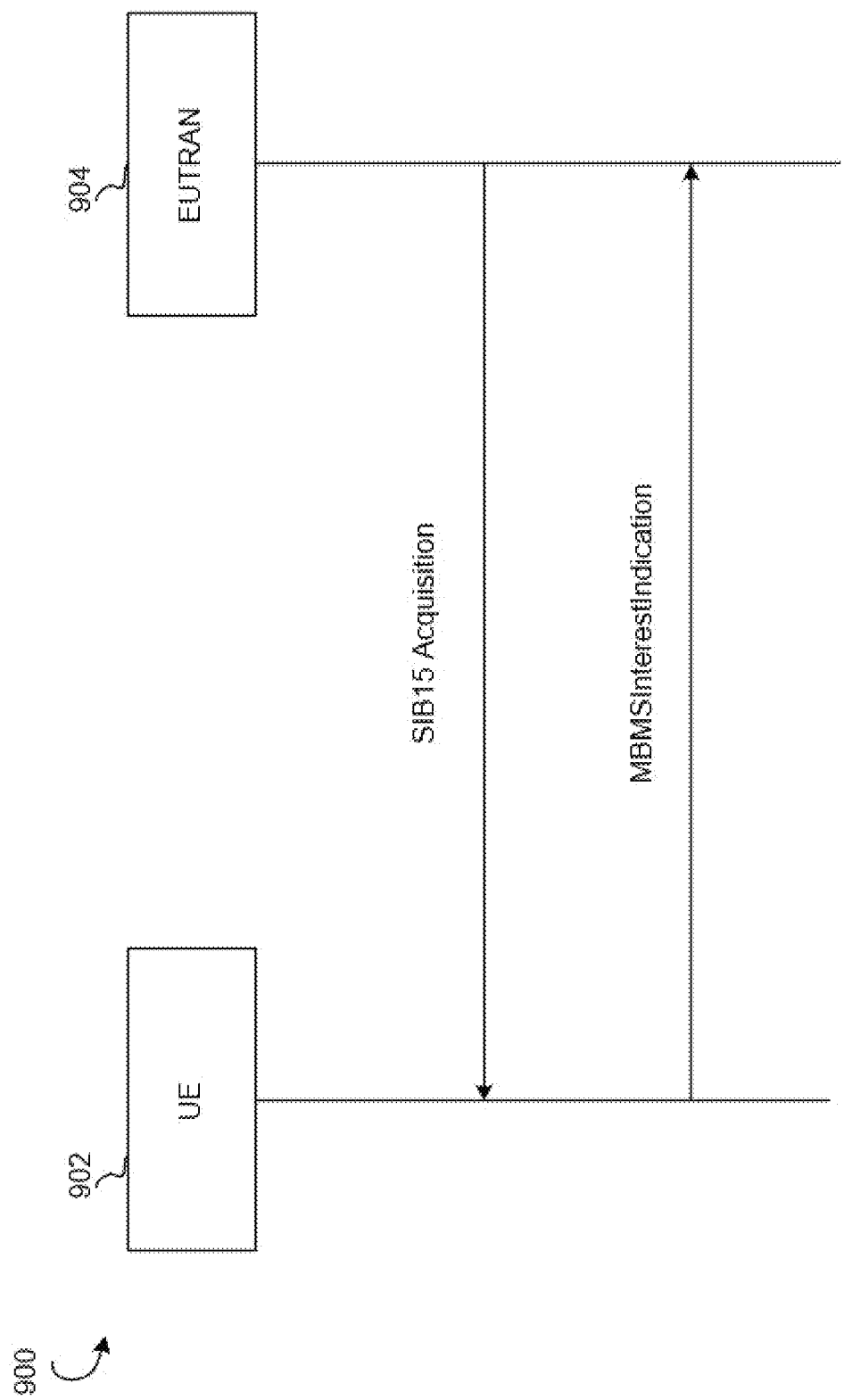
FIG. 9 illustrates a flow diagram of an example transmission of an MBMSInterestIndication message, in accordance with some embodiments of the present disclosure.

FIG. 9 illustrates a flow diagram of an example transmission of an MBMSInterestIndication message, in accordance with some embodiments of the present disclosure. The flow diagram 900 includes a UE 102 and a EUTRAN 904. The UE 902 sends the MBMSInterestIndication message in response to receiving the SIB15 from the EUTRAN 904 (also shown in FIG. 7). Therefore, when the cell does not broadcast the SIB15, the UE 902 will not send the MBMSInterestIndication message.

6. Target Cell Selection

Figure 11:
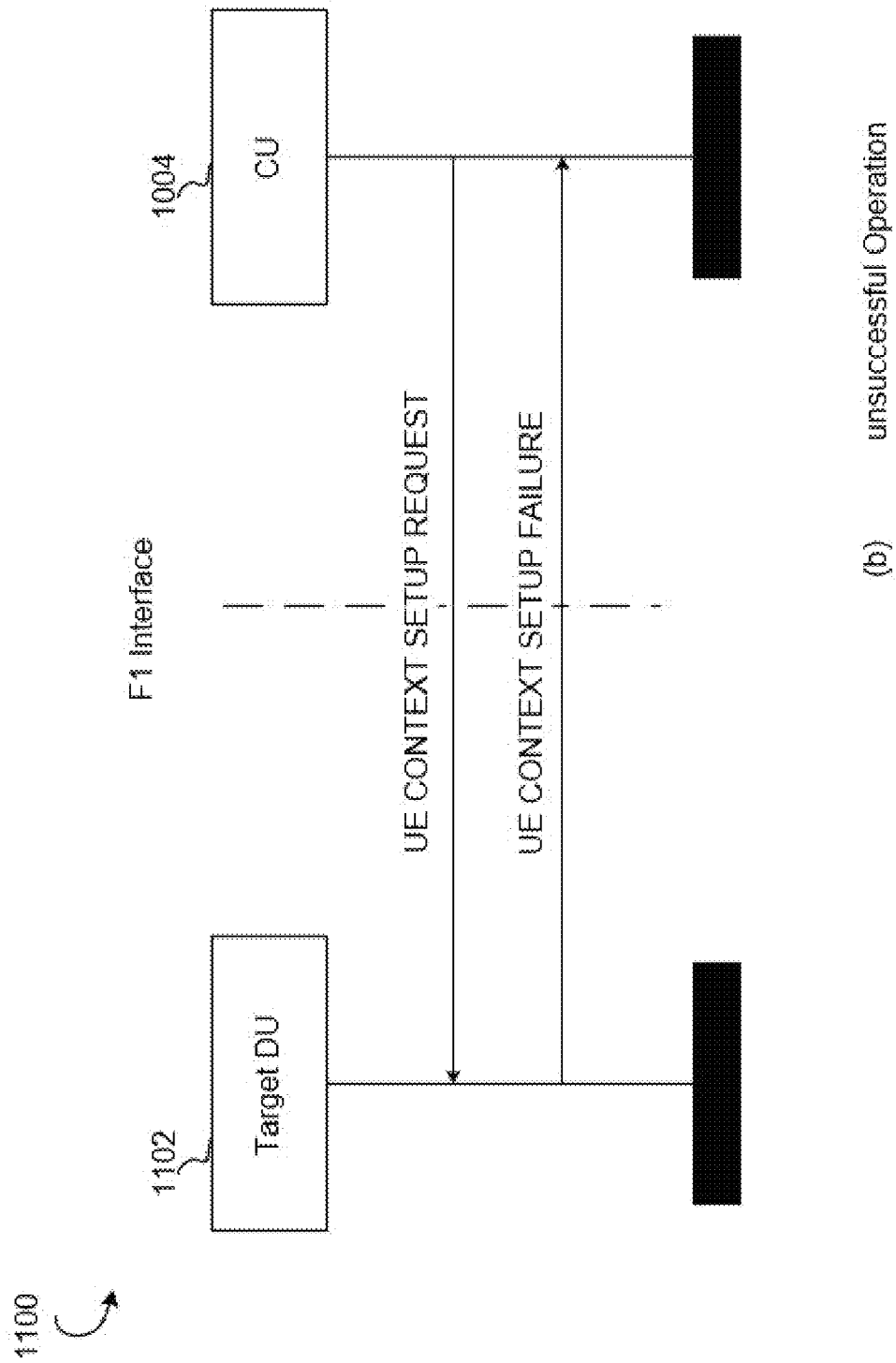
FIG. 11 illustrates a flow diagram of an example unsuccessful operation of a UE Context Setup Request procedure, in accordance with some embodiments of the present disclosure.

The CU determines the target cell of UE handover according to the reported measurement report (e.g., a Measure- FIG. 11 illustrates a flow diagram of an example unsuccessful operation of a UE Context Setup Request procedure, in accordance with some embodiments of the present disclosure. The flow diagram 1100 includes a Target DU 1102 and a CU 1104 that communicate with one another via an F1 interface.

With reference to FIG. 10 and FIG. 11, the purpose of the UE CONTEXT SETUP process is to request the Target DU 1002, 1102 to establish a UE context and multicast data bearer or one or more unicast data bearers. The CU 1004, 1104 initiates the procedure by sending UE CONTEXT SETUP REQUEST message to the Target DU 1002, 1102. If the Target DU 1002, 1102 succeeds to establish the UE context, it replies to the CU 1004, 1104 with UE CONTEXT SETUP RESPONSE message. If the Target DU 1002, 1102 is not able to establish an F1 UE context, or cannot even establish one bearer it shall consider the procedure as failed and reply with the UE CONTEXT SETUP FAILURE message.

The UE CONTEXT SETUP REQUEST message also contains HandoverPreparationInformation (in CU to DU RRC Information IE). The RRC information could include mobility control, radio resource configuration (including RBs, MAC main configuration and physical channel configuration) and AS security configuration.

8. MBMS Scheduling Information Transmission

The purpose of scheduling information transmission is that CU notifies the radio resource configuration of the MBMS service to UE in the target cell. The present disclosure provides two feasible solutions for the CU to deliver scheduling information to UEs.

8.1 Carrying MBMS Scheduling Information in a Dedicated RRC Message

Figure 12:
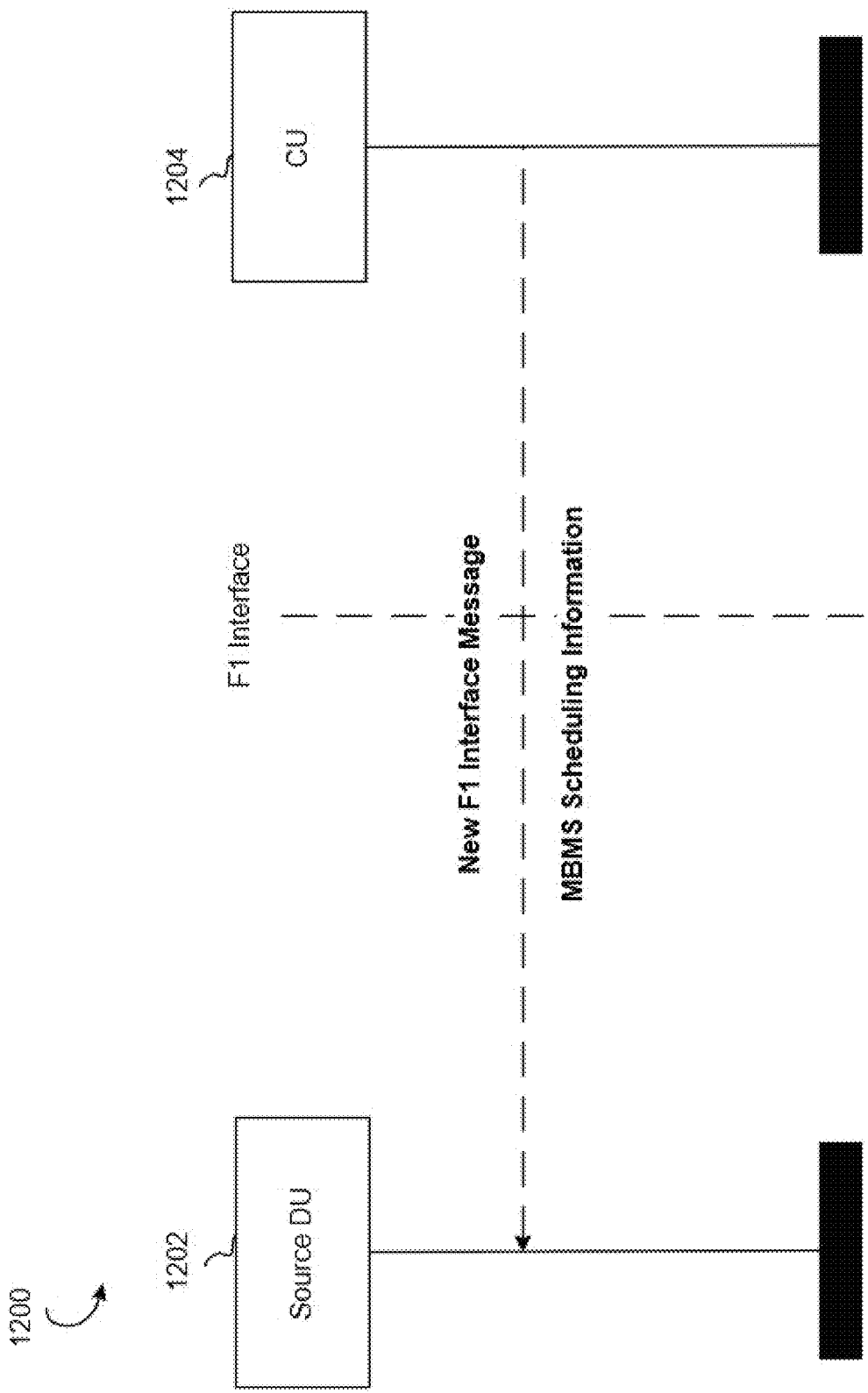
FIG. 12 illustrates a flow diagram of an example transmission of an RRC message via an F1 interface from a CU to a Source DU, in accordance with some embodiments of the present disclosure.

FIG. 12 illustrates a flow diagram of an example transmission of an RRC message via an F1 interface from a CU to a Source DU, in accordance with some embodiments of the present disclosure. The flow diagram 1200 includes a Source DU 1202 and a CU 1204 that communicate with one another via an F1 interface. As shown in FIG. 12, an RRC message carrying scheduling information can be sent on an F1 interface to the Source DU 1202 through a new F1 interface message (e.g., MBMS scheduling information).

Figure 13:
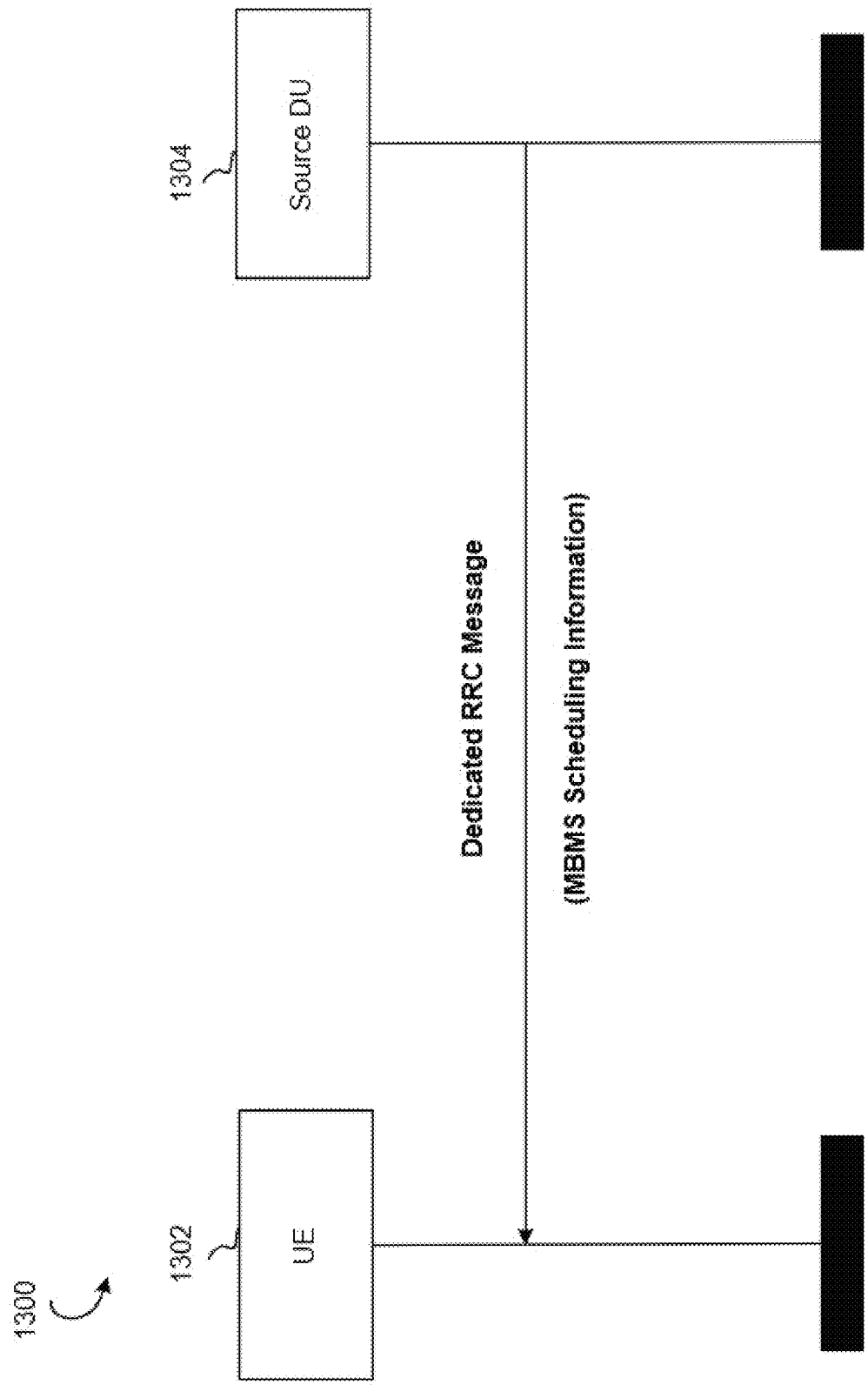
FIG. 13 illustrates a flow diagram of an example transmission of an RRC message via an air interface from a Source DU to a UE, in accordance with some embodiments of the present disclosure.

FIG. 13 illustrates a flow diagram of an example transmission of an RRC message via an air interface from a Source DU to a UE, in accordance with some embodiments of the present disclosure. The flow diagram 1300 includes a UE 1302 (e.g., UE 102 in FIG. 1) and a Source DU 1304. As shown in FIG. 13, the Source DU 1304 can send MBMS scheduling information that is carried in a dedicated RRC message to the UE 1302.

8.2 Carrying MBMS Scheduling Information in a New SIB Message

MBMS scheduling information is carried by a new SIB message, and broadcast to a UE (e.g., UE 102 in FIG. 1).

Figure 14:
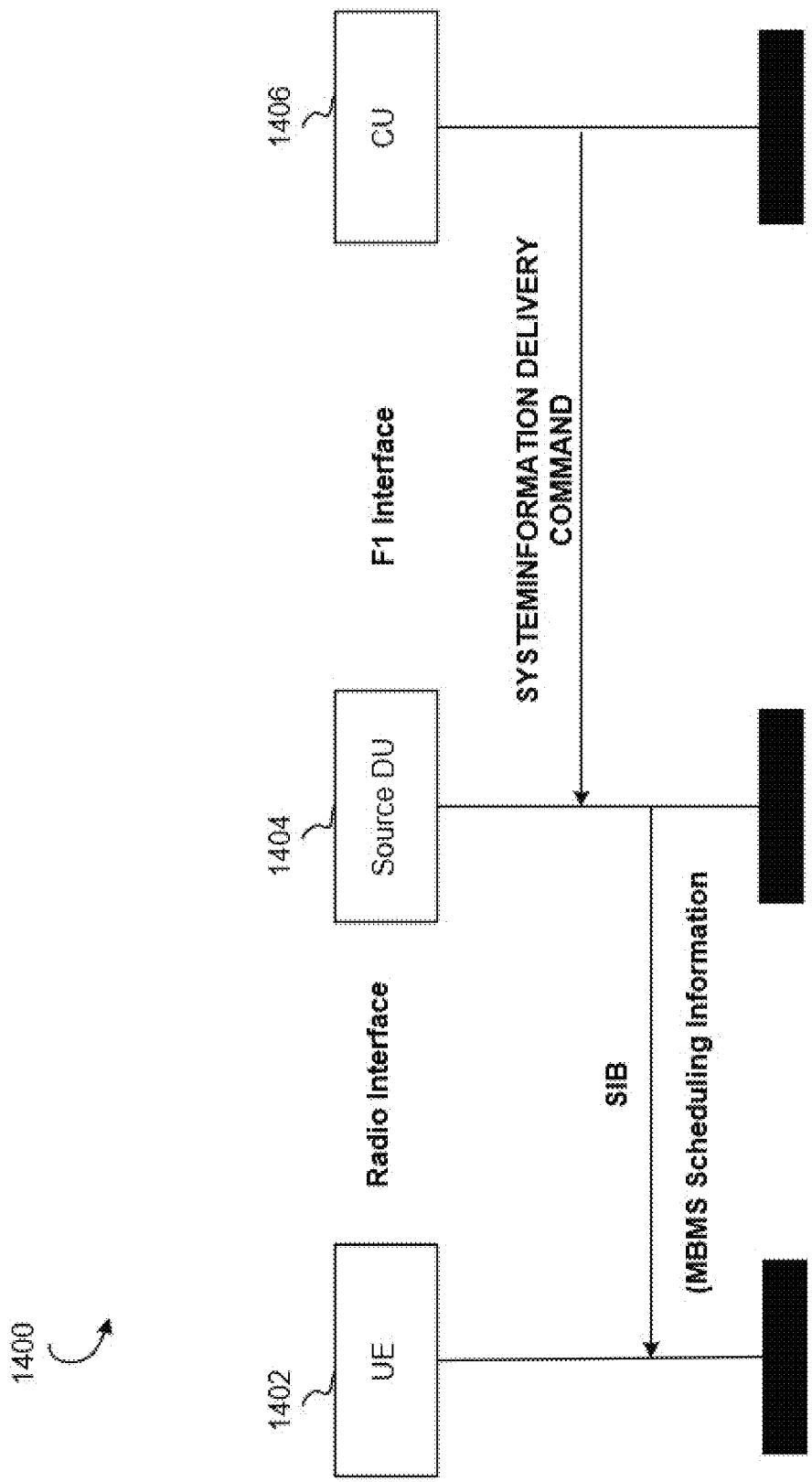
FIG. 14 illustrates a flow diagram of an example system information delivery procedure, in accordance with some embodiments of the present disclosure.

FIG. 14 illustrates a flow diagram of an example system information delivery procedure, in accordance with some embodiments of the present disclosure. The flow diagram 1400 includes a CU 1406 that communicates with a Source DU 1404 via an F1 interface. The flow diagram 1400 also includes a UE 102 that communicates with the Source DU 1404 via a Radio Interface. The transmission of SIB messages on the F1 interface is through the System Information Delivery procedure. The purpose of the System Information Delivery procedure is to command the Source DU 1404 to broadcast the SIB that carried MBMS scheduling information.

The CU 1406 initiates the procedure by sending a SYSTEM INFORMATION DELIVERY COMMAND message to the Source DU 1404.

8.3 Opportunities of Sending Scheduling Information

The opportunities of sending scheduling information greatly affects the service continuity of the UE, and then directly affects the final user experience. The present disclosure provides two possible opportunities (e.g., as shown in FIG. 15 and FIG. 16) of sending scheduling information.

Figure 15:
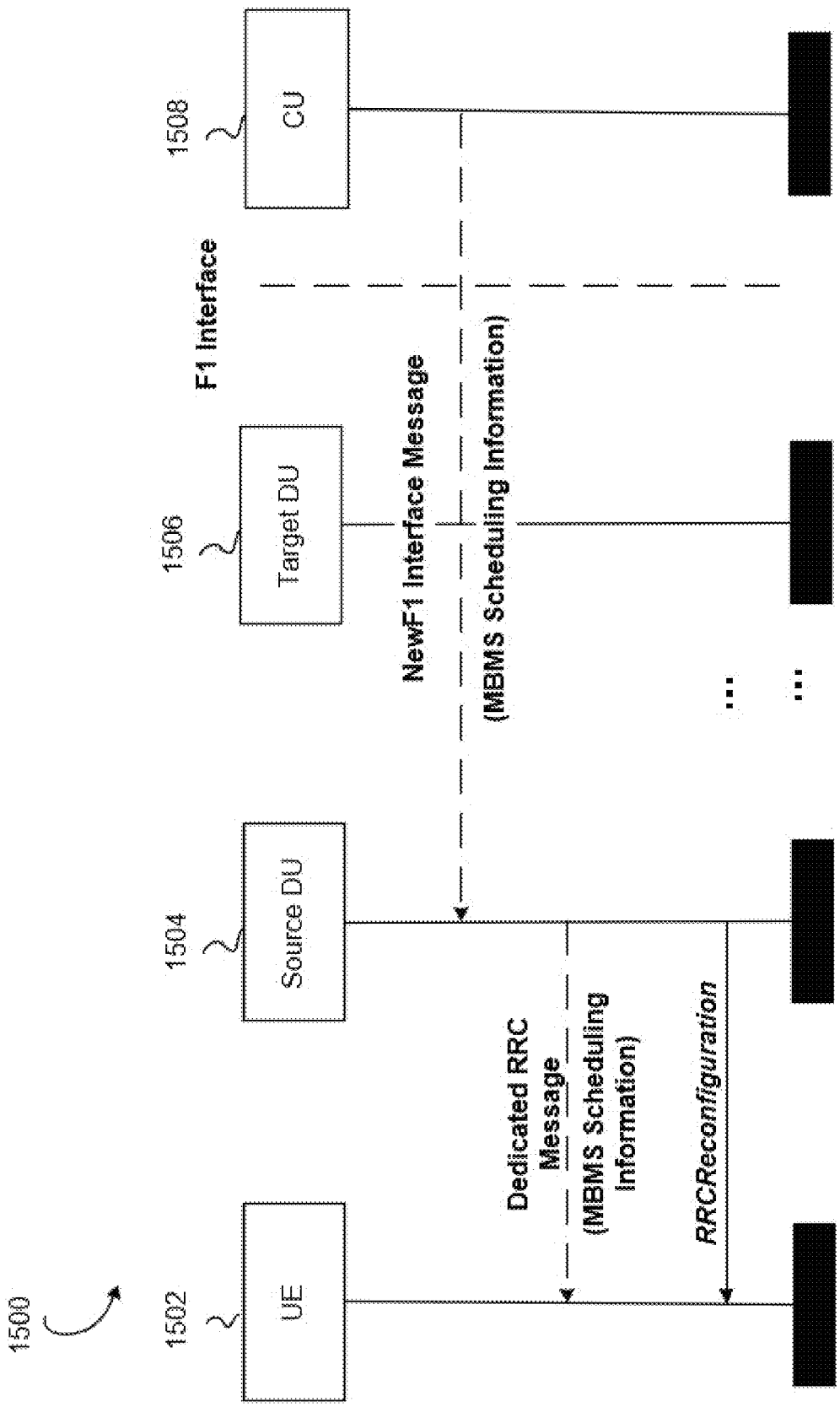
FIG. 15 illustrates a flow diagram of an example system information delivery procedure where scheduling information is transmitted before the switching process, in accordance with some embodiments of the present disclosure.

As a first opportunity, FIG. 15 illustrates a flow diagram of an example system information delivery procedure where scheduling information is transmitted before the switching process, in accordance with some embodiments of the present disclosure. The flow diagram 1500 includes a UE 1502, a Source DU 1504, a Target DU 1506, and a CU 1508.

That is, the transmission of the scheduling information is done before the UE 1502 is handed over to the target cell which is before forwarding the RRCReconfiguration message from Source DU 1504 to the UE 1502. In this way, after the UE 1502 is handed over to the target cell, it can receive broadcast multicast data immediately, bringing seamless continuous service reception. For example, the CU 1508 sends a new F1 interface message to the Source DU 1504. In response, the Source DU 1504 sends the dedicated RRC message to the UE 1502.

Figure 16:
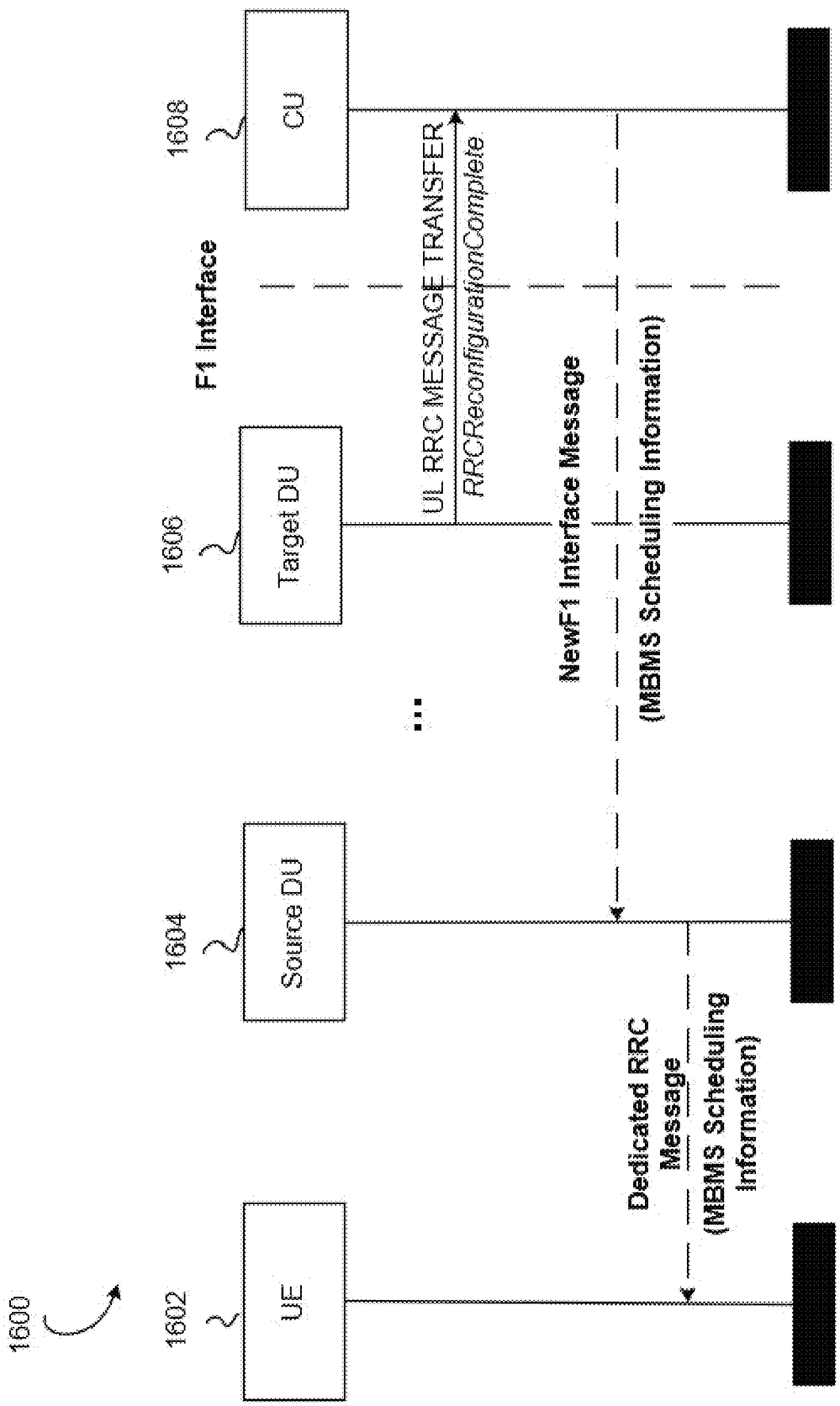
FIG. 16 illustrates a flow diagram of an example system information delivery procedure where scheduling information is transmitted after the switching process, in accordance with some embodiments of the present disclosure.

As a second opportunity, FIG. 16 illustrates a flow diagram of an example system information delivery procedure where scheduling information is transmitted after the switching process, in accordance with some embodiments of the present disclosure. The flow diagram 1600 includes a UE 1602, a Source DU 1604, a Target DU 1606, and a CU 1608.

That is, the transmission of the MBMS scheduling information (new F1 interface message) is after the UE 1602 is handed over to the target cell, such as after receiving the RRCReconfigurationComplete message from the target DU 1606 via an UL RRC Message Transfer. However, this time may cause a large interruption time of service receiving. To mitigate and/or avoid this large interruption time, after a UE 1602 is handed over to the target cell, it should wait for a period of time before receiving broadcast/multicast data.

9. RRC Reconfiguration Process

Figure 17:
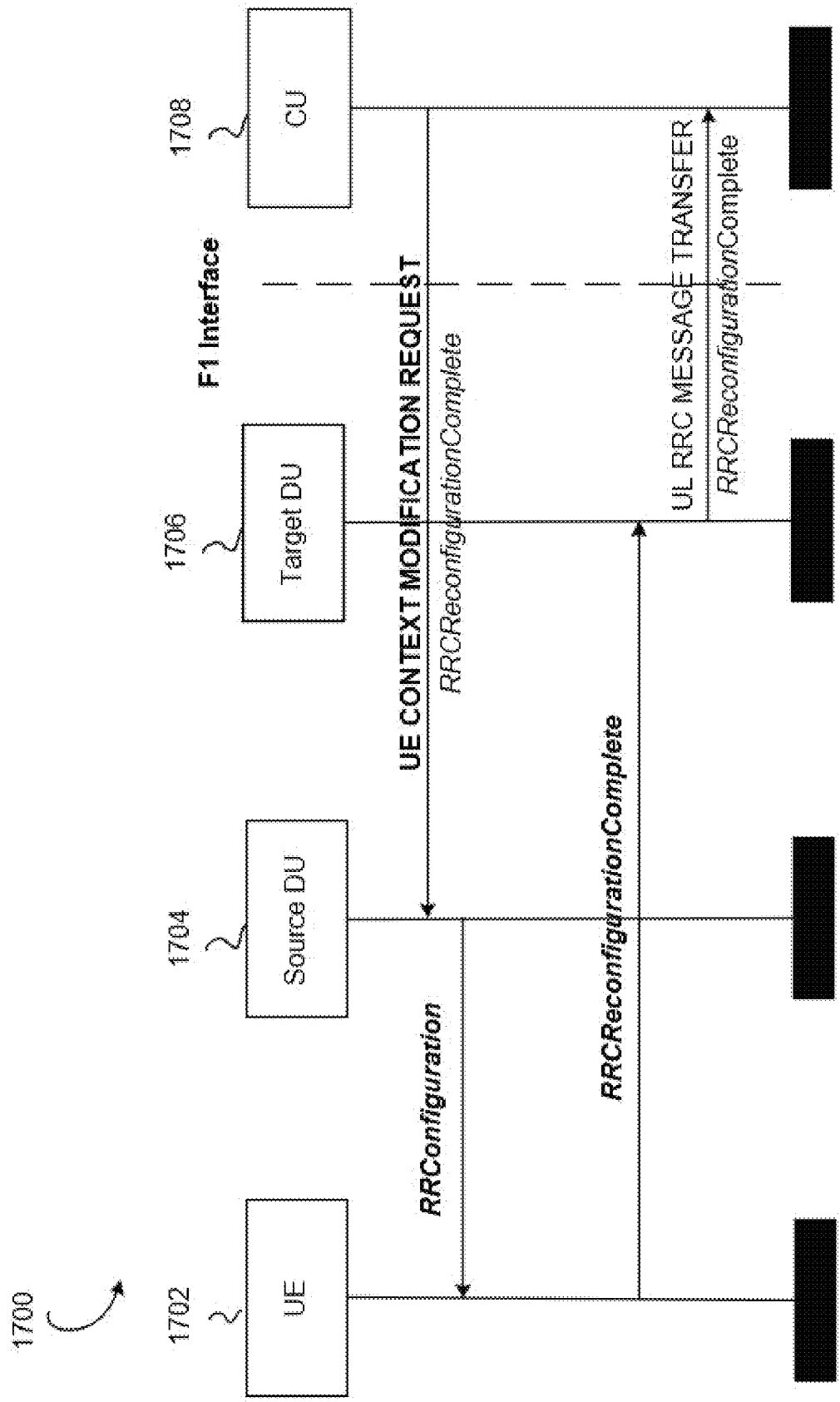
FIG. 17 illustrates a flow diagram of an example RRC reconfiguration process, in accordance with some embodiments of the present disclosure.

FIG. 17 illustrates a flow diagram of an example RRC reconfiguration process, in accordance with some embodiments of the present disclosure. The flow diagram 1700 includes a US 1702, a Source DU 1704, a Target DU 1706, and a CU 1708.

The flow of the RRC reconfiguration is a procedure of CU 1708 configuration and UE 1702 confirmation. The CU 1708 transmits a UE CONTEXT MODIFICATION REQUEST message over the F1 interface to carry the RRC Reconfiguration information to the Source DU 1704, and forwards it to the UE 1702 through a dedicated RRC message. In response, the UE 1702 returns an RRCReconfigurationComplete message to the target cell to confirm that the RRC connection reconfiguration is completed successfully. The UL RRC MESSAGE TRANSFER message is used to forward it to the CU 1708 on the F1 interface.

10. Methods for Managing 5G MBMS Continuity

Figure 18:
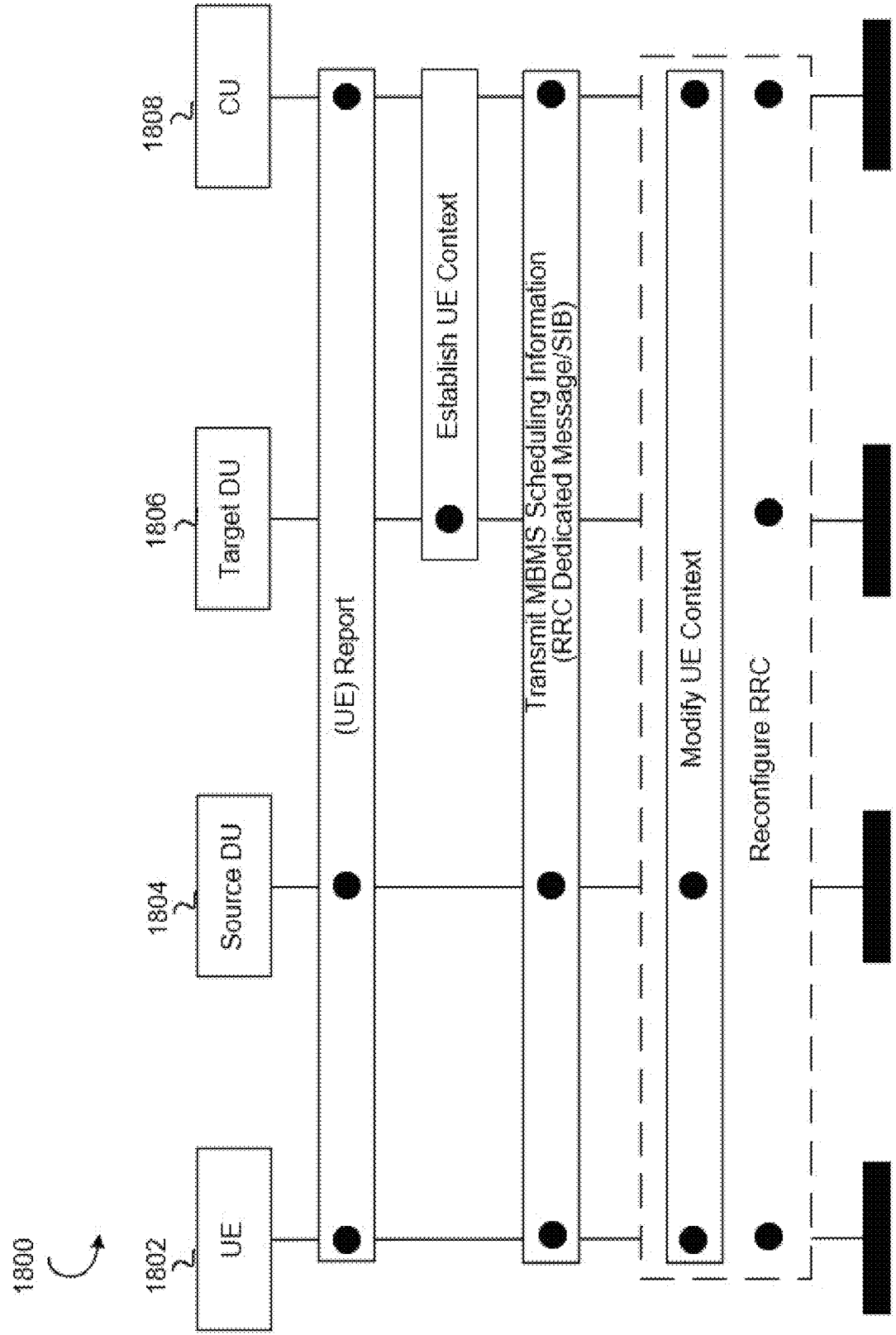
FIG. 18 illustrates a flow diagram of an example system information delivery procedure where scheduling information is transmitted before the switching process, in accordance with some embodiments of the present disclosure.

FIG. 18 illustrates a flow diagram of an example system information delivery procedure where scheduling information is transmitted before the switching process, in accordance with some embodiments of the present disclosure. The flow diagram 1800 includes a UE 1802, a Source DU 1804, a Target DU 1806, and a CU 1808.

As shown in FIG. 18, the scheduling information is sent before the handover. That is, the UE 1802, the Source DU 1804, the Target DU 1806 and/or the CU 1808 may communicate (send/receive) the UE report to one another. The Target DU 1806 and/or the CU 1808 may establish the UE context. The UE 1802, the Source DU 1804, the Target DU 1806 and/or the CU 1808 may communicate (send/receive) the MBMS Scheduling Information (via a RRC Dedicated Message/SIB) to one another. The UE 1802, the Source DU 1804, the Target DU 1806 and/or the CU 1808 may modify the UE context. The UE 1802, the Source DU 1804, the Target DU 1806 and/or the CU 1808 may reconfigure the RRC.

Figure 19:
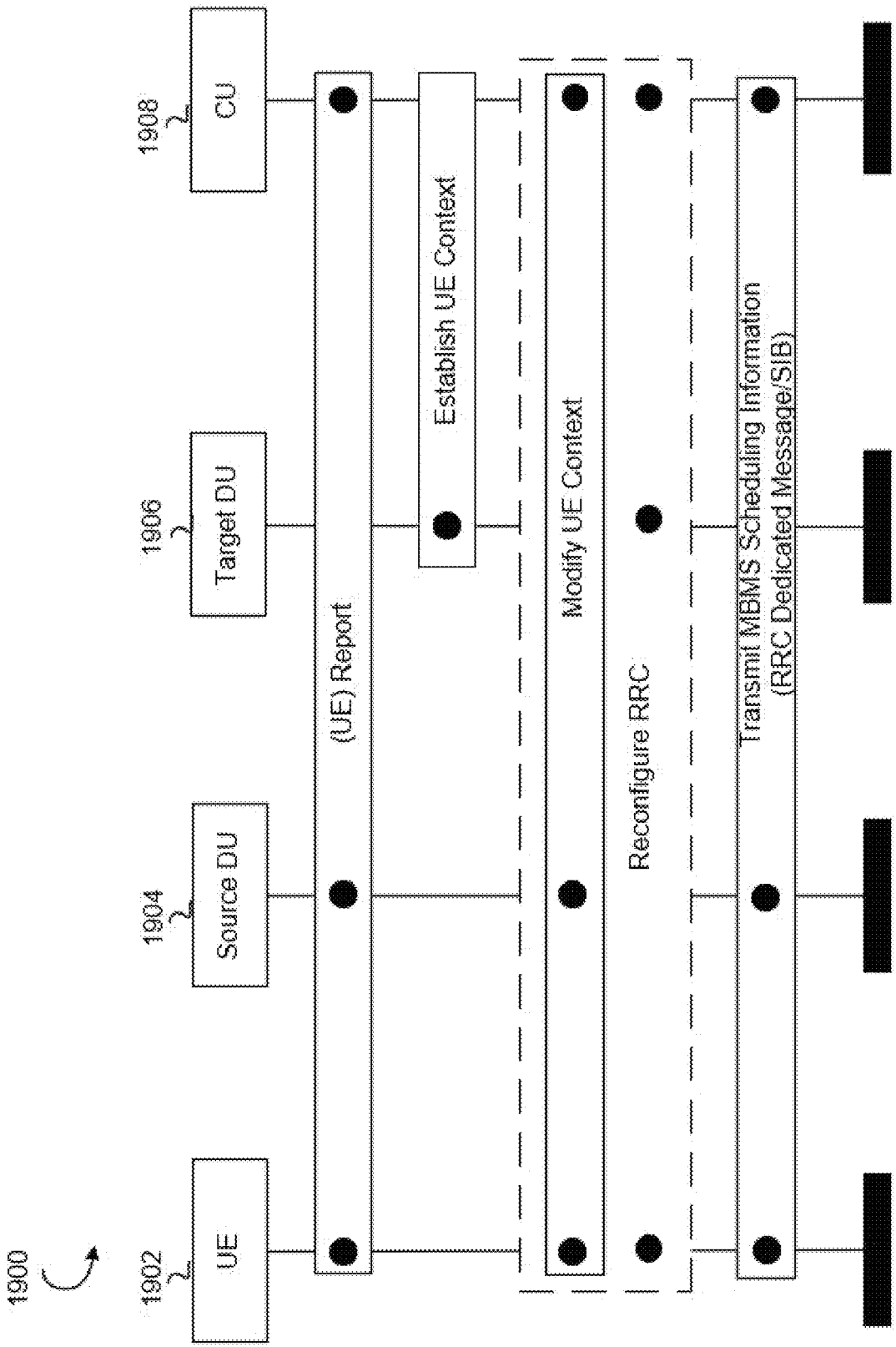
FIG. 19 illustrates a flow diagram of an example system information delivery procedure where scheduling information is transmitted after the switching process, in accordance with some embodiments of the present disclosure.

FIG. 19 illustrates a flow diagram of an example system information delivery procedure where scheduling information is transmitted after the switching process, in accordance with some embodiments of the present disclosure. The flow diagram 1900 includes a UE 1902, a Source DU 1904, a Target DU 1906, and a CU 1908.

The UE 1902, the Source DU 1904, the Target DU 1906 and/or the CU 1908 may communicate (send/receive) the UE report to one another. The Target DU 1906 and/or the CU 1908 may establish the UE context. The UE 1902, the Source DU 1904, the Target DU 1906 and/or the CU 1908 may modify the UE context. The UE 1902, the Source DU 1904, the Target DU 1906 and/or the CU 1908 may reconfigure the RRC. The UE 1902, the Source DU 1904, the Target DU 1906 and/or the CU 1908 may communicate (send/receive) the MBMS Scheduling Information (via a RRC Dedicated Message/SIB) to one another.

FIG. 20 illustrates a table of solutions (embodiments) of Service Continuity Receiving for RRC_CONNECTED UE, in accordance with some embodiments of the present disclosure. That is, the table 2000 shows the solutions (embodiments) of achieving service continuity receiving for UEs in a connected state, based on the opportunities of sending scheduling information and the ways of carrying MBMS scheduling information (e.g., dedicated RRC messages or new SIB).

Figure 21:
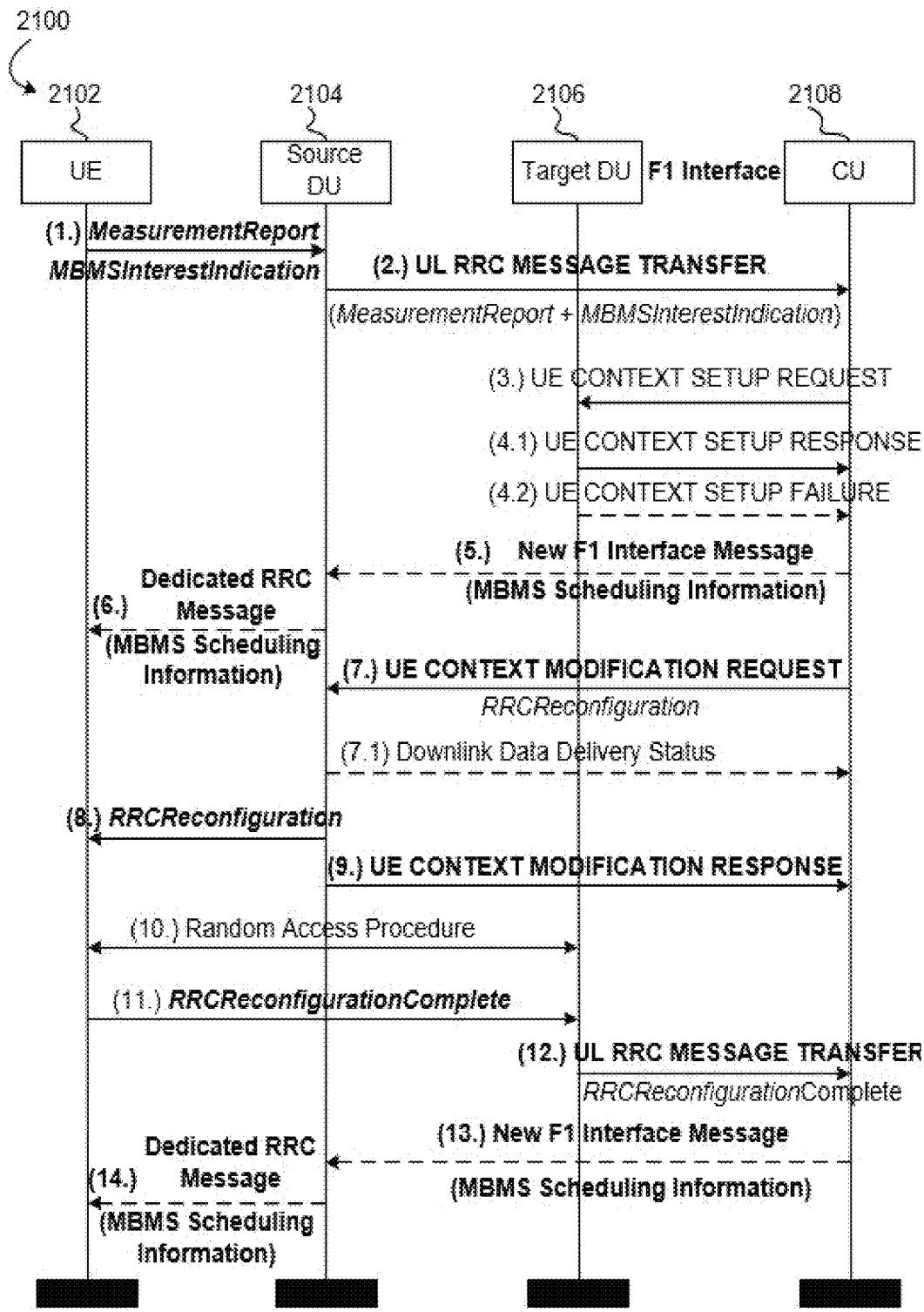
FIG. 21 illustrates a flow diagram of an example connected UE cross-DU handover process where a dedicated RRC message carries scheduling information, in accordance with some embodiments of the present disclosure.

FIG. 21 illustrates a flow diagram of an example connected UE cross-DU handover process where a dedicated RRC message carries scheduling information, in accordance with some embodiments of the present disclosure. The flow diagram 2100 includes a UE 2102, a Source DU 2104, a Target DU 2106, and a CU 2108.

The UE 2102 sends a Measurement Report and an MBMS Interest Indication to the Source DU 2104. The Source DU 2104 sends the Measurement Report and the MBMS Interest Indication to the CU 2108. The CU 2108 sends the UE CONTEXT SETUP REQUEST to the Target DU 2106. The Target DU 2106 sends the UE CONTEXT SETUP RESPONSE and/or FAILURE message to the CU 2108. The CU 2108 send a new F1 Interface Message to the Source DU 2104. The Source DU 2104 sends the dedicated RRC message to the UE 2102. The CU 2108 send the UE CONTEXT MODIFICATION REQUEST to the Source DU 2104. The Source DU 2104 sends the downlink data delivery status to the CU 2108. The Source DU 2104 sends the RRC Reconfiguration to the UE 2102. The Source DU 2104 sends the UE CONTEXT MODIFICATION RESPONSE to the CU 2108. The UE 2102 and/or the Target DU 2106 perform the random access procedure. The UE 2102 sends the RRC Reconfiguration Complete message to the Target DU 2106. The Target DU 2106 sends the RRC Reconfiguration Complete message to the CU 2108. The CU 2108 sends a new F1 Interface Message to the Source DU 2104. The Source DU 2104 sends the dedicated RRC message to the UE 2102.

Figure 22:
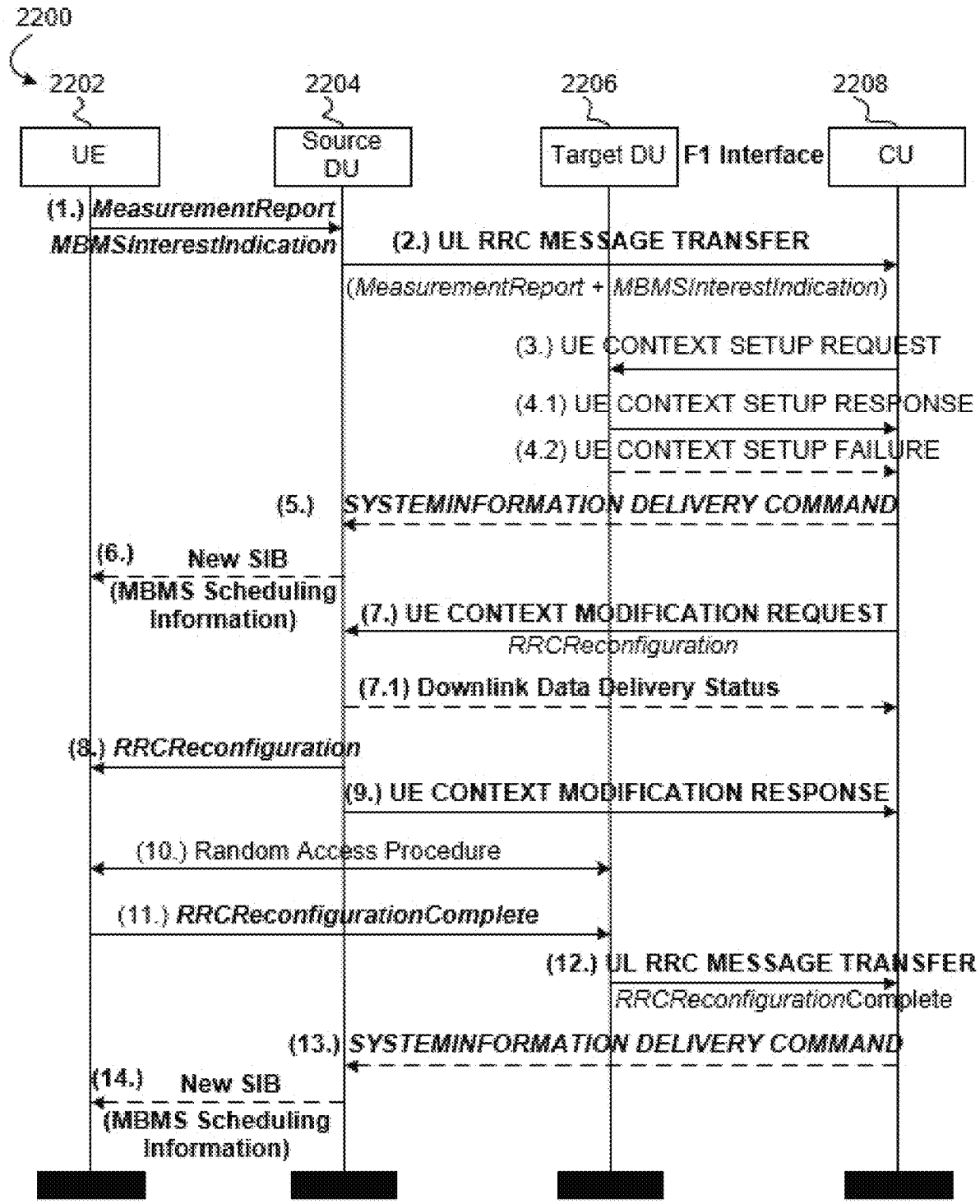
FIG. 22 illustrates a flow diagram of an example connected UE cross-DU handover process where a dedicated RRC message carries scheduling information, in accordance with some embodiments of the present disclosure.

FIG. 22 illustrates a flow diagram of an example connected UE cross-DU handover process where a dedicated RRC message carries scheduling information, in accordance with some embodiments of the present disclosure. The flow diagram 2200 includes a UE 2202, a Source DU 2204, a Target DU 2206, and a CU 2208. Based on the Inter-gNB-DU unicast mobility, the flow diagram 2200 provides supplementary information on interaction messages and flows in broadcast/multicast service scenarios.

The UE 2202 sends a Measurement Report and an MBMS Interest Indication to the Source DU 2204. The Source DU 2204 sends the Measurement Report and the MBMS Interest Indication to the CU 2208. The CU 2208 sends the UE CONTEXT SETUP REQUEST to the Target DU 2206. The Target DU 2206 sends the UE CONTEXT SETUP RESPONSE and/or FAILURE message to the CU 2208. The CU 2208 send a SYSTEM INFORMATION DELIVERY COMMAND to the Source DU 2204. The Source DU 2204 sends the new SIB message to the UE 2202. The CU 2208 send the UE CONTEXT MODIFICATION REQUEST to the Source DU 2204. The Source DU 2204 sends the downlink data delivery status to the CU 2208. The Source DU 2204 sends the RRC Reconfiguration to the UE 2202. The Source DU 2204 sends the UE CONTEXT MODIFICATION RESPONSE to the CU 2208. The UE 2202 and/or the Target DU 2206 perform the random access procedure. The UE 2202 sends the RRC Reconfiguration Complete message to the Target DU 2206. The Target DU 2206 sends the RRC Reconfiguration Complete message to the CU 2208. The CU 2208 sends a SYSTEM INFORMATION DELIVERY COMMAND message to the Source DU 2204. The Source DU 2204 sends the dedicated RRC message to the UE 2202.

Figure 23:
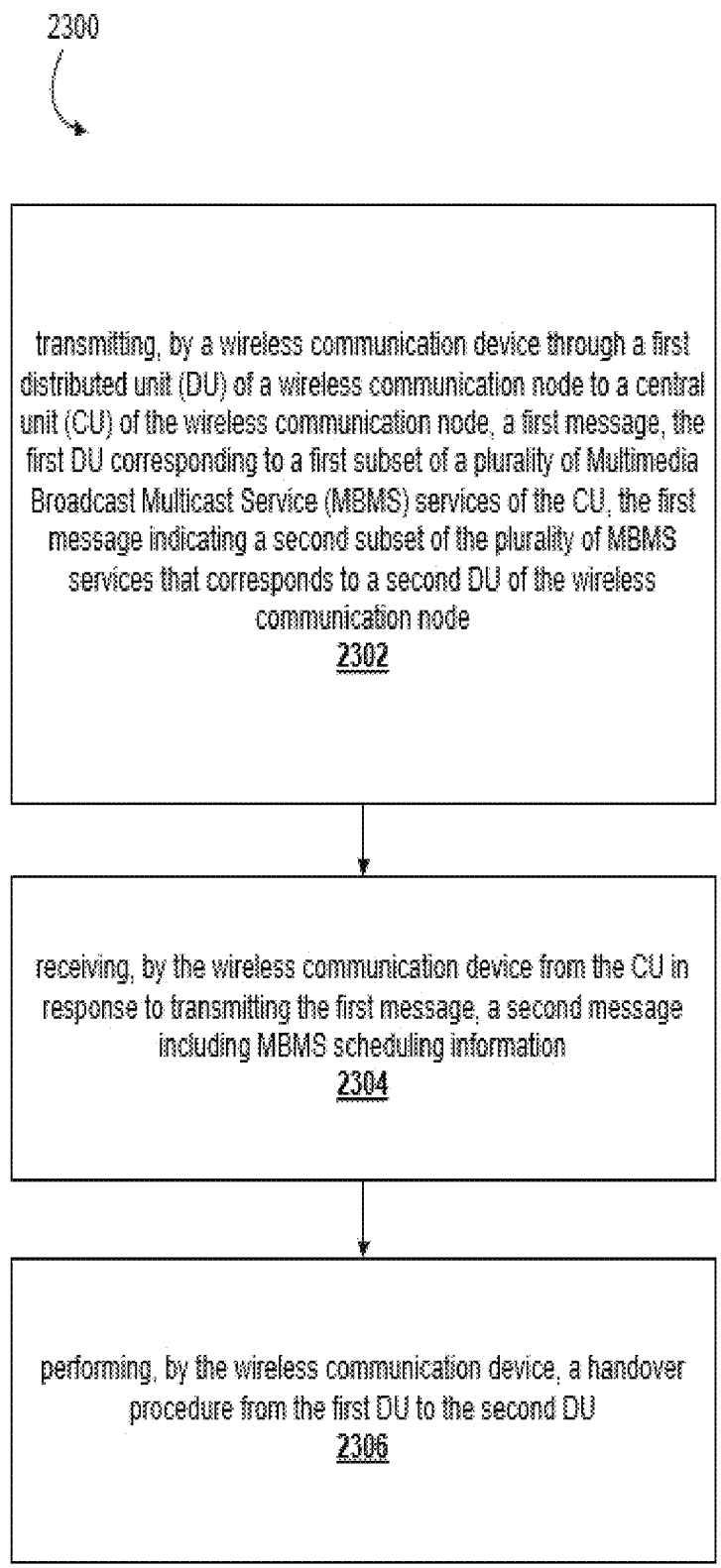
FIG. 23 is a flow diagram depicting a method for managing Multimedia Broadcast Multicast Service (MBMS) continuity, in accordance with some embodiments of the present disclosure.

FIG. 23 is a flow diagram depicting a method for managing Multimedia Broadcast Multicast Service (MBMS) continuity, in accordance with some embodiments of the present disclosure. Additional, fewer, or different operations may be performed in the method depending on the particular embodiment. In some embodiments, some or all operations of method 2300 may be performed by a wireless communication node, such as BS 102 in FIG. 1. In some operations, some or all operations of method 2300 may be performed by a wireless communication device, such as UE 104 in FIG. 1. Each operation may be re-ordered, added, removed, or repeated.

As shown, the method 2300 includes the operation 2302 of transmitting, by a wireless communication device through a first distributed unit (DU) of a wireless communication node to a central unit (CU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node. The method 2300 includes the operation 2304 of receiving, by the wireless communication device from the CU in response to transmitting the first message, a second message including MBMS scheduling information. The method 2300 includes the operation 2306 of performing, by the wireless communication device, a handover procedure from the first DU to the second DU.

FIG. 24 is a flow diagram depicting a method for managing Multimedia Broadcast Multicast Service (MBMS) continuity, in accordance with some embodiments of the present disclosure. Additional, fewer, or different operations may be performed in the method depending on the particular embodiment. In some embodiments, some or all operations of method 2400 may be performed by a wireless communication node, such as BS 102 in FIG. 1. In some operations, some or all operations of method 2400 may be performed by a wireless communication device, such as UE 104 in FIG. 1. Each operation may be re-ordered, added, removed, or repeated.

As shown, the method 2400 includes the operation 2402 of receiving, by a central unit (CU) of a wireless communication node, from a wireless communication device through a first distributed unit (DU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node. The method 2400 includes the operation 2404 of transmitting, by the CU to the wireless communication device, in response to receiving the first message, a second message including MBMS scheduling information. The method 2400 includes the operation 2406 of causing the wireless communication device to perform a handover procedure from the first DU to the second DU.

Figure 25:
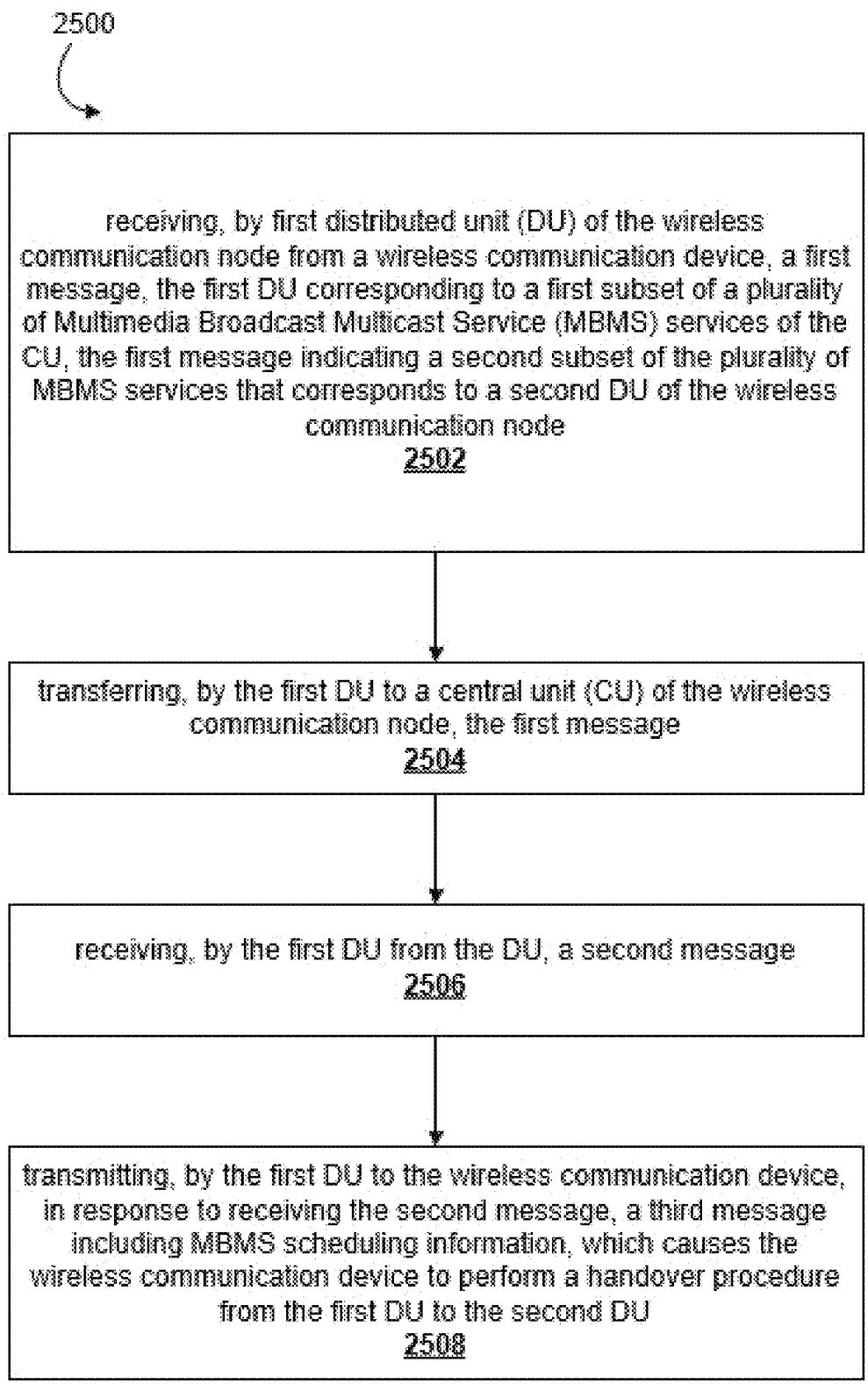
FIG. 25 is a flow diagram depicting a method for managing Multimedia Broadcast Multicast Service (MBMS) continuity, in accordance with some embodiments of the present disclosure.

FIG. 25 is a flow diagram depicting a method for managing Multimedia Broadcast Multicast Service (MBMS) continuity, in accordance with some embodiments of the present disclosure. Additional, fewer, or different operations may be performed in the method depending on the particular embodiment. In some embodiments, some or all operations of method 2500 may be performed by a wireless communication node, such as BS 102 in FIG. 1. In some operations, some or all operations of method 2500 may be performed by a wireless communication device, such as UE 104 in FIG. 1. Each operation may be re-ordered, added, removed, or repeated.

As shown, the method 2500 includes the operation 2502 of receiving, by first distributed unit (DU) of a wireless communication node from a wireless communication device, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node. The method 2500 includes the operation 2504 of transferring, by the first DU to a central unit (CU) of the wireless communication node, the first message. The method 2500 includes the operation 2506 of receiving, by the first DU from the DU, a second message. The method 2500 includes the operation 2508 of transmitting, by the first DU to the wireless communication device, in response to receiving the second message, a third message including MBMS scheduling information, which causes the wireless communication device to perform a handover procedure from the first DU to the second DU.

Figure 26:
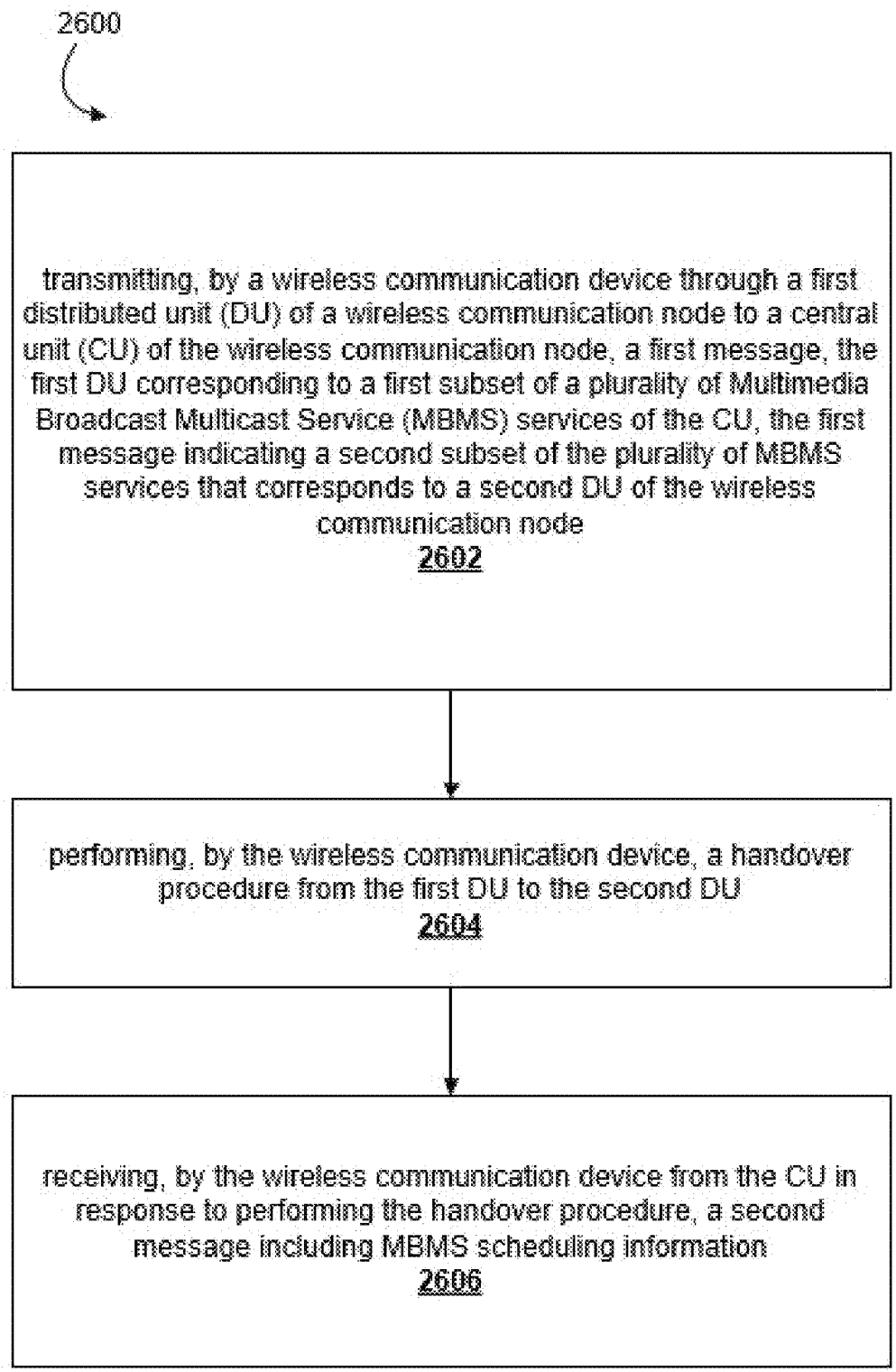
FIG. 26 is a flow diagram depicting a method for managing Multimedia Broadcast Multicast Service (MBMS) continuity, in accordance with some embodiments of the present disclosure.

FIG. 26 is a flow diagram depicting a method for managing Multimedia Broadcast Multicast Service (MBMS) continuity, in accordance with some embodiments of the present disclosure. Additional, fewer, or different operations may be performed in the method depending on the particular embodiment. In some embodiments, some or all operations of method 2600 may be performed by a wireless communication node, such as BS 102 in FIG. 1. In some operations, some or all operations of method 2600 may be performed by a wireless communication device, such as UE 104 in FIG. 1. Each operation may be re-ordered, added, removed, or repeated.

As shown, the method 2600 includes the operation 2602 of transmitting, by a wireless communication device through a first distributed unit (DU) of a wireless communication node to a central unit (CU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node. The method 2600 includes the operation 2604 of performing, by the wireless communication device, a handover procedure from the first DU to the second DU. The method 2600 includes the operation 2606 of receiving, by the wireless communication device from the CU in response to performing the handover procedure, a second message including MBMS scheduling information.

FIG. 27 is a flow diagram depicting a method for managing Multimedia Broadcast Multicast Service (MBMS) continuity, in accordance with some embodiments of the present disclosure. Additional, fewer, or different operations may be performed in the method depending on the particular embodiment. In some embodiments, some or all operations of method 2700 may be performed by a wireless communication node, such as BS 102 in FIG. 1. In some operations, some or all operations of method 2700 may be performed by a wireless communication device, such as UE 104 in FIG. 1. Each operation may be re-ordered, added, removed, or repeated.

As shown, the method 2700 includes the operation 2702 of receiving, by a central unit (CU) of a wireless communication node, from a wireless communication device through a first distributed unit (DU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node. The method 2700 includes the operation 2704 of transmitting, by the CU to the wireless communication device, in response to determining that the wireless communication device has performed a handover procedure from the first DU to the second DU, a second message including MBMS scheduling information.

Figure 28:
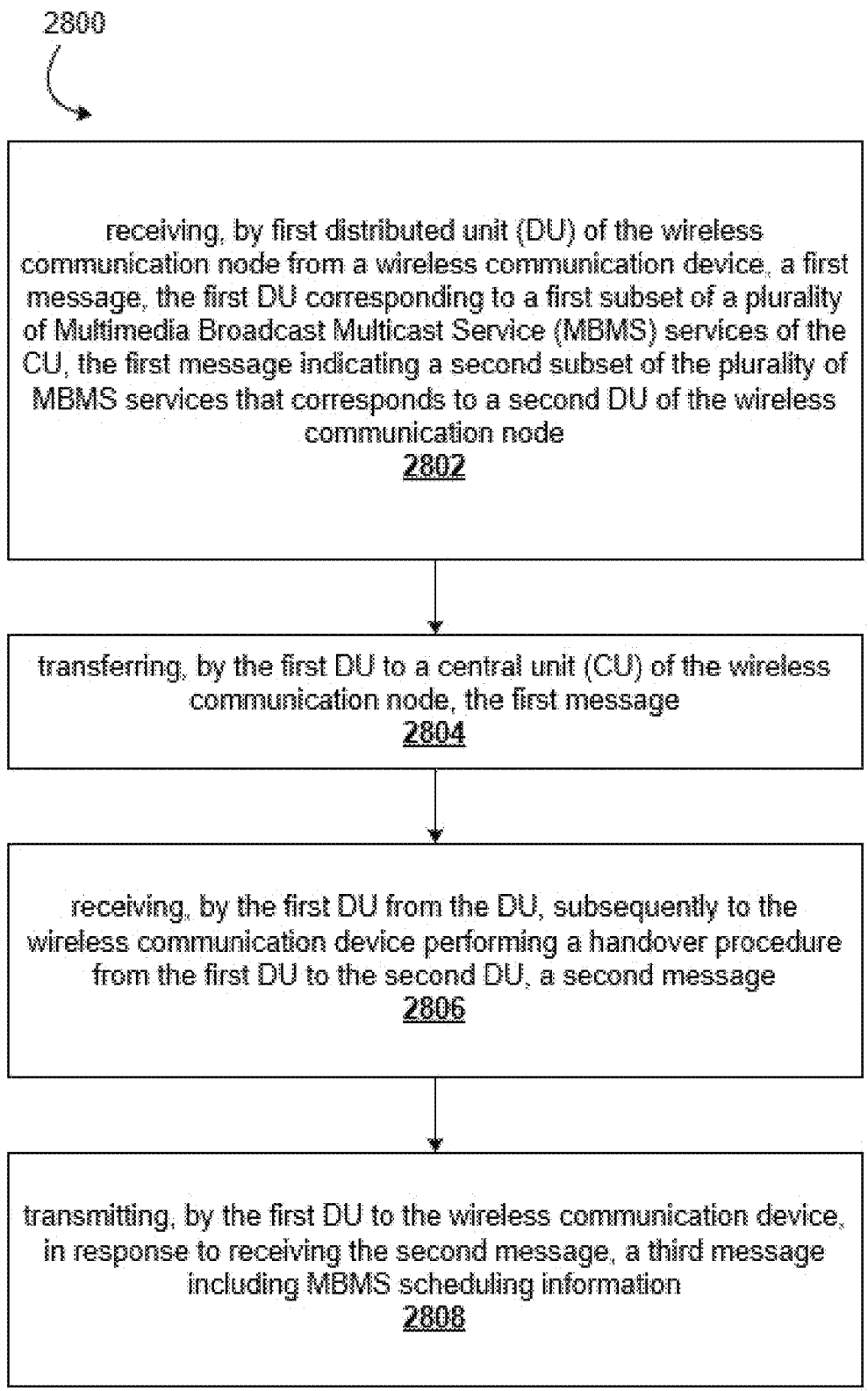
FIG. 28 is a flow diagram depicting a method for managing Multimedia Broadcast Multicast Service (MBMS) continuity, in accordance with some embodiments of the present disclosure.

FIG. 28 is a flow diagram depicting a method for managing Multimedia Broadcast Multicast Service (MBMS) continuity, in accordance with some embodiments of the present disclosure. Additional, fewer, or different operations may be performed in the method depending on the particular embodiment. In some embodiments, some or all operations of method 2800 may be performed by a wireless communication node, such as BS 102 in FIG. 1. In some operations, some or all operations of method 2800 may be performed by a wireless communication device, such as UE 104 in FIG. 1. Each operation may be re-ordered, added, removed, or repeated.

As shown, the method 2800 includes the operation 2802 of receiving, by first distributed unit (DU) of a wireless communication node from a wireless communication device, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node. The method 2800 includes the operation 2804 of transferring, by the first DU to a central unit (CU) of the wireless communication node, the first message. The method 2800 includes the operation 2806 of receiving, by the first DU from the DU, subsequently to the wireless communication device performing a handover procedure from the first DU to the second DU, a second message. The method 2800 includes the operation 2808 of transmitting, by the first DU to the wireless communication device, in response to receiving the second message, a third message including MBMS scheduling information.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
   transmitting, by a wireless communication device through a first distributed unit (DU) of a wireless communication node to a central unit (CU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node;
   receiving, by the wireless communication device from the CU in response to transmitting the first message, a second message including MBMS scheduling information; and
   performing, by the wireless communication device, a handover procedure from the first DU to the second DU.

2. The wireless communication method of claim 1, wherein the first message includes a MBMSInterestIndication message, the MBMSInterestIndication message including a list of MBMS services that the wireless communication device is receiving, each of the MBMS services being associated with a respective service identifier.

3. A non-transitory computer readable medium storing instructions, which when executed by at least one processor, cause the at least one processor to perform the wireless communication method of claim 2.

4. The wireless communication method of claim 1, wherein receiving the second message comprises:
receiving, from the first DU, the MBMS scheduling information via a dedicated radio resource control (RRC) message,
wherein the MBMS scheduling information is transmitted from the CU to the first DU via a defined F1-interface message.

5. The wireless communication method of claim 1, wherein receiving a second message comprises:
receiving, from the first DU, the MBMS scheduling information via a defined system information block (SIB), in response to the first DU receiving a SYSTEMINFORMATION DELIVERY COMMAND from the CU.

6. A non-transitory computer readable medium storing instructions, which when executed by at least one processor, cause the at least one processor to perform the wireless communication method of claim 1.

7. A wireless communication method, comprising:
receiving, by a central unit (CU) of a wireless communication node, from a wireless communication device through a first distributed unit (DU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node;
transmitting, by the CU to the wireless communication device, in response to receiving the first message, a second message including MBMS scheduling information; and
causing the wireless communication device to perform a handover procedure from the first DU to the second DU.

8. The wireless communication method of claim 7, wherein the first message includes a MBMSInterestIndication message, the MBMSInterestIndication message including a list of MBMS services that the wireless communication device is receiving, each of the MBMS services being associated with a respective service identifier.

9. The wireless communication method of claim 7, wherein transmitting a second message comprises:
transmitting, by the CU to the first DU, a defined F1-interface message including the MBMS scheduling information, which causes the first DU to transmit the MBMS scheduling information to the wireless communication device via a dedicated radio resource control (RRC) message.

10. The wireless communication method of claim 7, wherein transmitting a second message further comprises:
transmitting, by the CU to the first DU, a SYSTEMINFORMATION DELIVERY COMMAND, which causes the first DU to transmit the MBMS scheduling information via a defined system information block (SIB).

11. A wireless communication device comprising:
at least one processor configured to:
transmit, via a transceiver through a first distributed unit (DU) of a wireless communication node to a central unit (CU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node;
receive, via the transceiver from the CU in response to transmitting the first message, a second message including MBMS scheduling information; and
perform a handover procedure from the first DU to the second DU.

12. The wireless communication device of claim 11, wherein the first message includes a MBMSInterestIndication message, the MBMSInterestIndication message including a list of MBMS services that the wireless communication device is receiving, each of the MBMS services being associated with a respective service identifier.

13. A non-transitory computer readable medium storing instructions, which when executed by at least one processor, cause the at least one processor to perform the wireless communication method of claim 12.

14. The wireless communication device of claim 11, wherein the at least one processor is configured to:
receive, via the transceiver from the first DU, the MBMS scheduling information via a dedicated radio resource control (RRC) message,
wherein the MBMS scheduling information is transmitted from the CU to the first DU via a defined F1-interface message.

15. The wireless communication device of claim 11, wherein the at least one processor is configured to:
receive, via the transceiver from the first DU, the MBMS scheduling information via a defined system information block (SIB), in response to the first DU receiving a SYSTEMINFORMATION DELIVERY COMMAND from the CU.

16. A non-transitory computer readable medium storing instructions, which when executed by at least one processor, cause the at least one processor to perform the wireless communication method of claim 11.

17. A wireless communication node comprising:
at least one processor configured to:
receive, by a central unit (CU) of the wireless communication node, from a wireless communication device through a first distributed unit (DU) of the wireless communication node, a first message, the first DU corresponding to a first subset of a plurality of Multimedia Broadcast Multicast Service (MBMS) services of the CU, the first message indicating a second subset of the plurality of MBMS services that corresponds to a second DU of the wireless communication node;
transmit, by the CU to the wireless communication device, in response to receiving the first message, a second message including MBMS scheduling information; and
cause the wireless communication device to perform a handover procedure from the first DU to the second DU.

18. The wireless communication node of claim 17, wherein the first message includes a MBMSInterestIndication message, the MBMSInterestIndication message including a list of MBMS services that the wireless communication device is receiving, each of the MBMS services being associated with a respective service identifier.

19. The wireless communication node of claim 17, wherein the at least one processor is configured to:
transmit, by the CU to the first DU, a defined F1-interface message including the MBMS scheduling information, which causes the first DU to transmit the MBMS scheduling information to the wireless communication device via a dedicated radio resource control (RRC) message.

20. The wireless communication node of claim 17, wherein the at least one processor is configured to:
transmit, by the CU to the first DU, a SYSTEMINFORMATION DELIVERY COMMAND, which causes the first DU to transmit the MBMS scheduling information via a defined system information block (SIB).

* * * * *